(12) United States Patent
Ohnishi

(10) Patent No.: US 10,457,078 B2
(45) Date of Patent: Oct. 29, 2019

(54) MANUFACTURING METHOD FOR PRODUCT USING PERMEABLE MEDIUM

(71) Applicant: MIMAKI ENGINEERING CO., LTD., Nagano (JP)

(72) Inventor: Masaru Ohnishi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 15/705,266

(22) Filed: Sep. 15, 2017

(65) Prior Publication Data

US 2018/0079232 A1    Mar. 22, 2018

(30) Foreign Application Priority Data

Sep. 16, 2016   (JP) ................. 2016-181885

(51) Int. Cl.
  *B41J 11/70*   (2006.01)
  *B41J 2/01*    (2006.01)
  *B41J 11/00*   (2006.01)
  *B29C 64/147*  (2017.01)
  *B33Y 10/00*   (2015.01)

(52) U.S. Cl.
  CPC ............ *B41J 11/70* (2013.01); *B29C 64/147* (2017.08); *B33Y 10/00* (2014.12); *B41J 2/01* (2013.01); *B41J 11/002* (2013.01)

(58) Field of Classification Search
  CPC ............ B41J 11/70; B41J 11/002; B41J 11/01
  See application file for complete search history.

(56) References Cited

U.S. PATENT DOCUMENTS

| | | | | |
|---|---|---|---|---|
| 5,281,499 A | * | 1/1994 | Bussard | A41D 27/08 |
| | | | | 101/129 |
| 6,499,513 B1 | * | 12/2002 | Couch | A41H 3/08 |
| | | | | 112/470.03 |
| 9,155,357 B2 | * | 10/2015 | Chon | A43D 1/00 |
| 2010/0035027 A1 | * | 2/2010 | Hill | G09F 3/02 |
| | | | | 428/195.1 |
| 2015/0251452 A1 | * | 9/2015 | Hatanaka | B41M 7/009 |
| | | | | 347/102 |

FOREIGN PATENT DOCUMENTS

JP       2007031888       2/2007

* cited by examiner

*Primary Examiner* — Bradley W Thies
(74) *Attorney, Agent, or Firm* — JCIPRNET

(57) ABSTRACT

Provided is a manufacturing method that may improve the degree of freedom in designing and manufacturing a product in which a permeable medium is used. The manufacturing method may include: an image printing step of forming an image by inkjet printing on a permeable medium based on processing data (S102); a cutting step of cutting the permeable medium into parts in shapes based on the processing data after the image is printed on the permeable medium by inkjet printing in the image printing step (S104); and an assembling step of assembling the parts into a product (S105). The image printing step uses an ink for image printing that can be dried and fixed after a solvent is vaporized from the ink heated by ultraviolet irradiation.

8 Claims, 24 Drawing Sheets

MANUFACTURING METHOD FOR PRODUCT USING PERMEABLE MEDIUM

CROSS REFERENCE TO RELATED APPLICATIONS

This application claims the priority benefit of Japanese Patent Application No. 2016-181885, filed on Sep. 16, 2016. The entirety of the above-mentioned patent application is hereby incorporated by reference herein and made a part of this specification.

TECHNICAL FIELD

This disclosure relates to a manufacturing method for a product using a permeable medium, particularly, a liquid-permeable medium.

DESCRIPTION OF THE BACKGROUND ART

In some of the known manufacturing methods for a product using a permeable medium, an image may be directly formed by inkjet printing on a woven product, such as T-shirt, based on processing data (for example, Japanese Unexamined Patent Publication No. 2007-031888).
Patent Literature 1: Japanese Unexamined Patent Publication No. 2007-031888

SUMMARY

In the known manufacturing methods employed to make a permeable medium-used product, an image is formed by inkjet printing on a ready-made article using low-viscosity aqueous inks. Such inks are likely to smear on the product and often fail to form a clear image at high concentration. This may constrain the range of product designs.

This disclosure is directed to providing a manufacturing method that may improve the degree of freedom in designing a product in which a permeable medium is used.

A manufacturing method disclosed herein may include: an image printing step of forming an image by inkjet printing on a permeable medium based on a processing data; a cutting step of cutting the permeable medium into parts in shapes based on the processing data after the image is printed on the permeable medium by inkjet printing in the image printing step; and an assembling step of assembling the parts into a product. The image printing step uses an ink for image printing that is able to be dried and fixed after a solvent is vaporized from the ink heated by ultraviolet irradiation.

Thus, the manufacturing method forms an image by inkjet printing on the permeable medium based on the processing data, cuts the image-printed permeable medium into parts in shapes based on the processing data, and puts together the parts into a product. According to this method, a product using a permeable medium with an optional image printed thereon may be manufactured in an optional shape on an on-demand basis. The manufacturing method may improve the degree of freedom in designing and manufacturing a product in which a permeable medium is used. The image-printing ink may be instantly heated by ultraviolet irradiation to immediately vaporize the solvent contained in this ink. Thus, the image-printing ink may be quickly dried and fixed. This manufacturing method, without exercising a special treatment, for example, pretreatment to the permeable medium, may allow a vivid image to be directly printed on the permeable medium on an on-demand basis using the image-printing ink less likely to smear on the medium. This may allow for more options of the permeable medium.

A manufacturing method disclosed herein may include: an image printing step of forming an image by inkjet printing on a permeable medium based on a processing data; a cutting step of cutting the permeable medium into parts in shapes based on the processing data after the image is printed on the permeable medium by inkjet printing in the image printing step; and an assembling step of assembling the parts into a product. The image printing step uses an ink for image printing selected from latex inks, UV-curable inks, and water-soluble UV-curable dye inks.

Thus, the manufacturing method forms an image by inkjet printing on the permeable medium based on the processing data, cuts the image-printed permeable medium into parts in shapes based on the processing data, and puts together the parts into a product. According to this method, a product using a permeable medium with an optional image printed thereon may be manufactured in an optional shape on an on-demand basis. The manufacturing method may improve the degree of freedom in designing and manufacturing a product in which a permeable medium is used. This manufacturing method, without exercising a special treatment, for example, pretreatment to the permeable medium, may allow a vivid image to be directly printed on the permeable medium on an on-demand basis using the image-printing ink less likely to smear on the medium. This may allow for more options of the permeable medium.

The manufacturing method may further include an adhesive applying step of applying an ink containing an adhesive to the permeable medium based on the processing data by inkjet printing, so as to apply the adhesive to the permeable medium. In the cutting step, the permeable medium may be cut in shapes based on the processing data into the parts after the image is formed on the permeable medium by inkjet printing in the image printing step and the adhesive is applied to the permeable medium in the adhesive applying step. In the assembling step, the adhesive applied to the parts may be heated to bond the parts to each other.

The manufacturing method that bonds the parts using the adhesive is possibly not required to sew the parts. This may facilitate the manufacture of a permeable medium-used product, allowing any unskilled person to easily make, for example, clothes. When shape-retaining main parts alone are selected from all of the cut parts and bonded, a preliminary design, shape, pattern, and/or layout may be checked on a person or a dummy, like tacking conventionally performed to make sewn products. By bonding all of the parts after the selected parts are checked, errors may be avoidable, for example, the parts bonded with displacement or bonded at wrong positions.

A manufacturing method disclosed herein may include: an adhesive applying step of applying an ink containing an adhesive to a permeable medium based on a processing data by inkjet printing, so as to apply the adhesive to the permeable medium; a cutting step of cutting the permeable medium into parts in shapes based on the processing data after the adhesive is applied to the permeable medium in the adhesive applying step; and an assembling step of assembling the parts into a product. In the assembling step, the adhesive applied to the parts may be heated to bond the parts to each other.

Thus, the manufacturing method applies the adhesive to the permeable medium based on the processing data, cuts the adhesive-applied permeable medium into parts in shapes based on the processing data, and puts together the parts into a product. According to this method, a product using a permeable medium may be manufactured in an optional shape on an on-demand basis. This manufacturing method may curtail steps in the manufacture of a permeable medium-used product and improve the degree of freedom in designing the product. The manufacturing method that bonds the parts using the adhesive is possibly not required to sew the parts. This may facilitate the manufacture of a permeable medium-used product, allowing any unskilled person to easily make, for example, clothes.

The adhesive-containing ink used in the manufacturing method may be an ink that is able to be dried and fixed after a solvent is vaporized from the ink heated by ultraviolet irradiation.

The adhesive-containing ink is instantly heated by ultraviolet irradiation to immediately vaporize the solvent contained in this ink. Thus, the adhesive-containing ink may be quickly dried and fixed. This manufacturing method, without exercising a special treatment, for example, pretreatment to the permeable medium, may prevent smearing of the adhesive-containing ink on the medium and allow the adhesive to be accurately applied to desired positions.

The adhesive-containing ink used in this manufacturing method may be selected from latex inks, UV-curable inks, and aqueous inks.

This manufacturing method uses the ink less likely to smear on the permeable medium. This method, therefore, may prevent smearing of the adhesive-containing ink on the medium and allow the adhesive to be accurately applied to desired positions without exercising a special treatment, for example, pretreatment to the permeable medium.

The manufacturing method may improve the degree of freedom in designing and manufacturing a product in which a permeable medium is used.

DETAILED DESCRIPTION OF EMBODIMENTS

An embodiment of this disclosure is hereinafter described referring to the accompanying drawings.

The description starts with structural features of a manufacturing system according to this embodiment.

Figure 1:
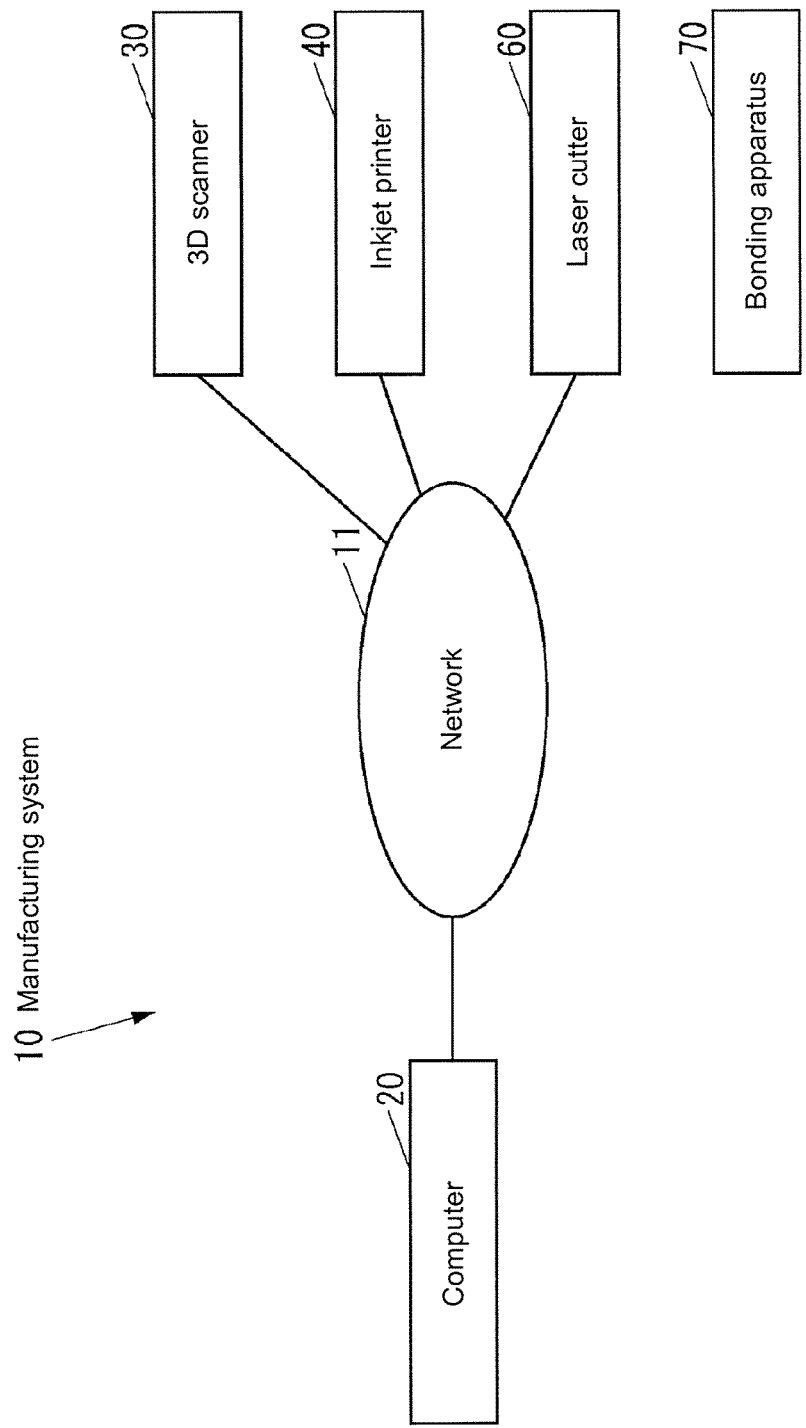
FIG. 1 is a block diagram of a manufacturing system according to an embodiment.

FIG. 1 is a block diagram of a manufacturing system 10 according to this embodiment.

The manufacturing system 10 illustrated in FIG. 1 manufactures a product using a liquid-permeable medium such as a woven fabric (hereinafter, "permeable medium product"). The manufacturing system 10 includes a computer 20 such as PC (personal computer), a 3D scanner 30 for reading 3D data from a three-dimensional object, an inkjet printer 40 for printing an image on the permeable medium, a laser cutter 60 for cutting the permeable medium, and a bonding apparatus 70 for bonding cut parts using an adhesive.

The computer 20, the 3D scanner 30, the inkjet printer 40, and the laser cutter 60 are allowed to communicate with one another through a network 11 such as LAN (Local Area Network). At least one of the 3D scanner 30, the inkjet printer 40, and the laser cutter 60 may directly communicate with the computer 20 wirelessly or by cable without the intervention of the network 11.

Figure 2:
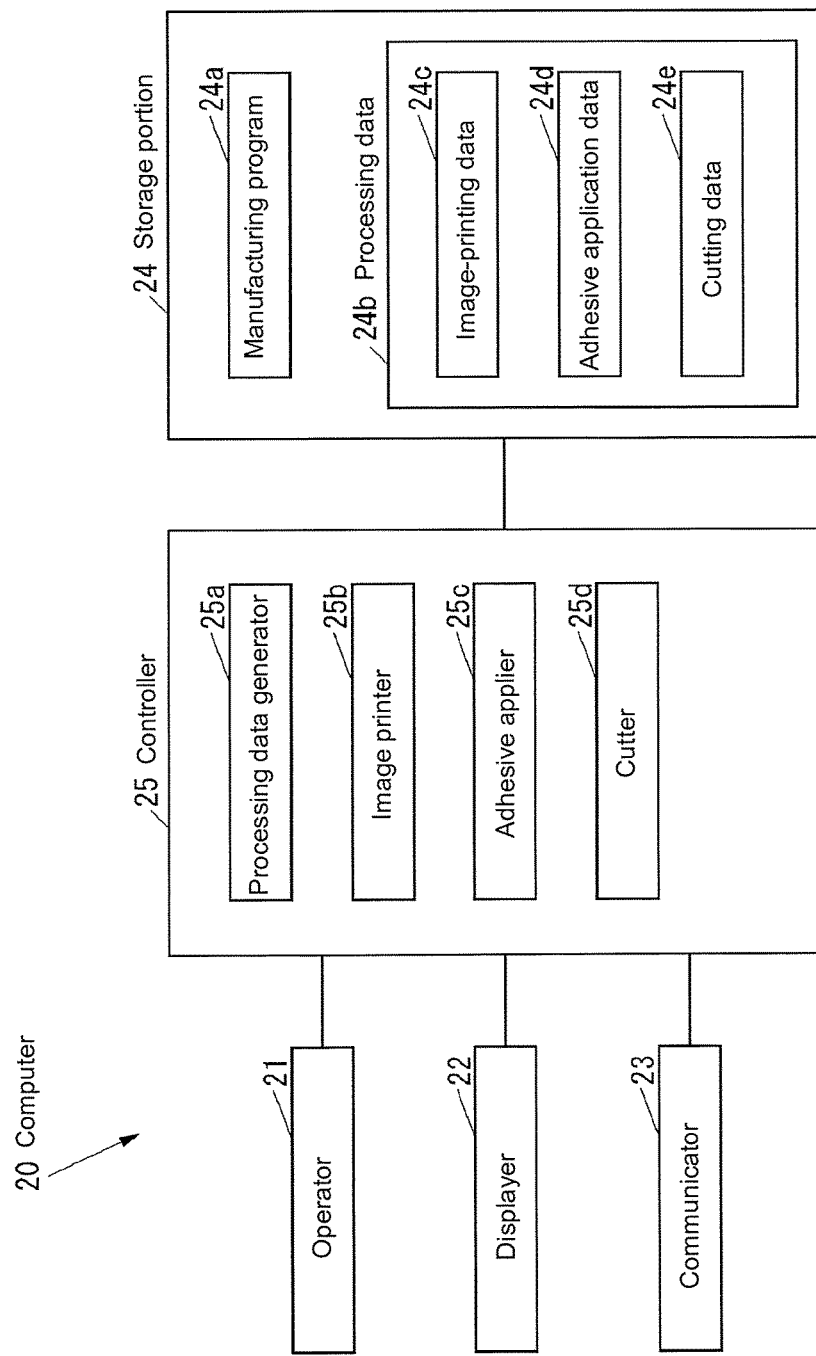
FIG. 2 is a block diagram of a computer illustrated in FIG. 1.

FIG. 2 is a block diagram of the computer 20.

As illustrated in FIG. 2, the computer 20 includes an operator 21, a displayer 22, a communicator 23, a storage portion 24, and a controller 25. The operator 21 is an input device, such as a mouse or a keyboard through which various operations are inputted. The displayer 22 is a display device, such as an LCD (Liquid Crystal Display) used to display various information. The communicator 23 is a communication device that communicates with an external device(s) through the network 11 (see FIG. 1) or directly communicates with an external device(s) wirelessly or by cable without the intervention of the network 11. The storage portion 24 is a non-volatile storage device, such as semiconductor memory or HDD (Hard Disk Drive) used to store various information. The controller 25 controls the whole computer 20.

A manufacturing program 24a, which is run to manufacture permeable medium products, is stored in the storage portion 24. The manufacturing program 24a may be installed in the computer 20 during its manufacturing process, or may be later installed in the computer 20 through the network 11 or from an external storage medium, such as USB (Universal Serial Bus) memory, CD (Compact Disc), or DVD (Digital Versatile Disc).

The storage portion 24 can store therein the data 24b based on which permeable medium products are processed (hereinafter, "processing data"). The processing data 24b includes an image-printing data 24c based on which an image is printed by the inkjet printer 40 to the permeable medium, an adhesive-application data 24d based on which an adhesive is applied by the inkjet printer 40 to the permeable medium, and a cutting data 24e based on which the permeable medium is cut by the laser cutter 60. The image-printing data 24c contains shape-design images and decorative images such as patterns, pockets, and ribbons. The adhesive-application data 24d contains adhesive-related images relevant to parts to be tacked or sewed. The cutting data 24e contains cutting-type images which are images to be mold for cutting.

The controller 25 includes CPU (Central Processing Unit), ROM (Read-only Memory) in which programs and data are prestored, and RAM (Random Access Memory) used as the CPU's work area. The CPU runs the programs stored in the ROM or the storage portion 24.

The controller 25 runs the manufacturing program 24a to implement a processing data generator 25a that generates the processing data 24b, an image printer 25b that prompts the inkjet printer 40 to print an image on the permeable medium, an adhesive applier 25c that prompts the inkjet printer 40 to apply an adhesive to the permeable medium, and a cutter 25d that prompts the laser cutter 60 to cut the permeable medium.

Figure 3:
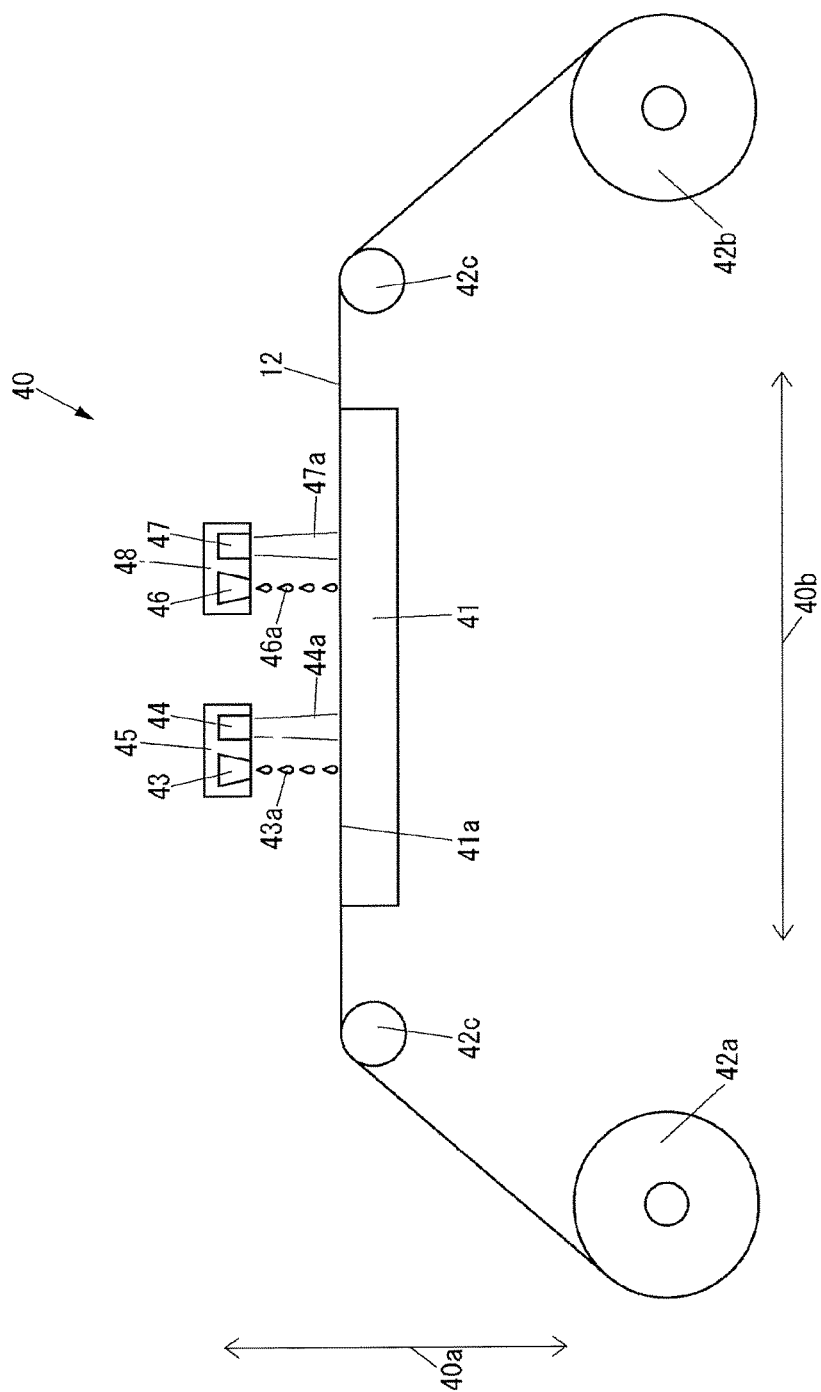
FIG. 3 is a schematic front view of an inkjet printer illustrated in FIG. 1.

FIG. 3 is a schematic front view of the inkjet printer 40.

As illustrated in FIG. 3, the inkjet printer 40 has a table 41, a feed roller 42a, a take-up roller 42b, and two direction-change rollers 42c. The table 41 supports a permeable medium 12 from its underside in a vertical direction indicated with arrow 40a. The permeable medium 12 is wound around and unwound from the feed roller 42a, and collected by the take-up roller 42b. While the permeable medium 12 unwound from the feed roller 42a is being transported to be finally collected by the take-up roller 42b, the direction-change rollers 42c change the permeable medium 12 in direction to feed this medium in a horizontal direction orthogonal to the vertical direction.

The table 41 has a support surface 41a for supporting the permeable medium 12. The support surface 41a extends in the horizontal direction.

The inkjet printer 40 transports the permeable medium 12 using the feed roller 42a and the take-up roller 42b, so as to feed the permeable medium 12 between the two direction-change rollers 42c in a horizontal direction indicated with arrow 40b.

The inkjet printer 40 has a plurality of heads for image printing 43. The image-printing heads 43 are inkjet heads from which image-printing inks 43a are discharged vertically downward to print an image on the permeable medium 12. The image-printing inks 43a are ultraviolet-curable inks cured by ultraviolet irradiation (hereinafter, "UV inks"). The inkjet printer 40 has an image-printing carriage 45 mounted with the image-printing heads 43 and an irradiator for image printing 44. The image-printing irradiator 44 is an ultraviolet irradiation device that irradiates the image-printing inks 43a discharged from the image-printing heads 43 with ultraviolet light 44a.

Though only one image-printing head 43 is illustrated in FIG. 3, the inkjet printer 40 may have plural image-printing heads 43 from which different image-printing inks 43a are discharged.

Examples of the image-printing ink 43a may be various color inks including cyan, magenta, yellow, black, red, green, blue, white, pearl, and metallic color inks.

The image-printing ink 43a may be an ink that can be instantly heated by ultraviolet irradiation to immediately vaporize the solvents contained in the inks. Such inks may be quickly dried and fixed (hereinafter, "UV instant-drying ink"). The image-printing ink 43a may be one selected from an ink containing a polymerizable heat-producible composition (hereinafter, "polymerizable heat-producible composition") and a polymerization-initiating UV absorbent, and an ink containing a UV absorbent alone with no polymerizable heat-producible composition.

The ink containing a polymerizable heat-producible composition is prepared by adding a polymerizable heat-producible composition of 15% to 50% by weight of the total ink weight, an UV absorbent of 5% to 10% by weight of the total ink weight, and a colorant of 2% to 10% by weight of the total ink weight into a solvent. The ink containing a polymerizable heat-producible composition may further contain an adjuster, if necessary, to adjust the ink's surface tension or viscosity.

Water is the main constituent of the solvent in the ink containing a polymerizable heat-producible composition.

In case the polymerizable heat-producible composition is radically polymerized, examples of this composition may include: monomers such as dipropylene diacrylate, isobornyl acrylate, and methoxybutyl acrylate; and oligomers such as polyester acrylate, epoxy acylate, and urethane acrylate. In case the polymerizable heat-producible composition is cationically polymerized, examples of this composition may include epoxy, vinylether, and oxetane.

The UV absorbent in the ink containing a polymerizable heat-producible composition may be selected from absorbents suitable for the material of the print target, i.e, the permeable medium 12. The UV absorbent in the ink containing a polymerizable heat-producible composition may absorb ultraviolet light to an extent that light absorption in the visible light region does not undermine color desirably produced by the colorant. The UV absorbent in the ink containing a polymerizable heat-producible composition may be selected from absorbents that effectively absorb ultraviolet light radiated from the image-printing irradiator 44, i.e., absorbents that can absorb as much light in the ultraviolet region as possible. The UV absorbent in the ink containing a polymerizable heat-producible composition may be selected from absorbents that excel in stability, for example, absorbents that can prevent that the image-printing inks 43a instantly heated by ultraviolet irradiation are burnt or discolored by the heat.

In case the polymerizable heat-producible composition is radically polymerized, the UV absorbent in the ink containing this composition may be selected from acetophenone-based and acyloxime-based absorbents. In case the polymerizable heat-producible composition is cationically polymerized, the UV absorbent in the ink containing this composition may be selected from absorbents that produce acid in response to ultraviolet irradiation.

The colorant in the ink containing a polymerizable heat-producible composition may be at least one of a pigment and a disperse dye.

The ink containing no polymerizable heat-producible composition is prepared by adding an UV absorbent of 5% to 10% by weight of the total ink weight, a binder resin of 10% to 50% by weight of the total ink weight, and a colorant of 2% to 10% by weight of the total ink weight into a solvent. As same as the ink containing a polymerizable heat-producible composition, the ink containing no polymerizable heat-producible composition may further contain an adjuster, if necessary, to adjust the ink's surface tension or viscosity.

As same as the ink containing a polymerizable heat-producible composition, water is the main constituent of the solvent in the ink containing no polymerizable heat-producible composition.

As same as the ink containing a polymerizable heat-producible composition, the UV absorbent in the ink containing no polymerizable heat-producible composition may be selected from absorbents, which is suitable for the material of the permeable medium 12. As same as the ink containing a polymerizable heat-producible composition, the UV absorbent in the ink containing no polymerizable heat-producible composition may absorb ultraviolet light to an extent that light absorption in the visible light region does not undermine color desirably produced by the colorant. As same as the ink containing a polymerizable heat-producible composition, the UV absorbent in the ink containing no polymerizable heat-producible composition may be selected from absorbents that effectively absorb ultraviolet light radiated from the image-printing irradiator 44, i.e., absorbents that can absorb as much light in the ultraviolet region as possible. As same as the ink containing a polymerizable heat-producible composition, the UV absorbent in the ink containing no polymerizable heat-producible composition may be selected from absorbents that excel in stability, for example, absorbents that can prevent that the image-printing inks 43a instantly heated by ultraviolet irradiation are burnt or discolored by the heat.

In case the polymerizing action is a radical polymerization, examples of the UV absorbent in the ink containing no polymerizable heat-producible composition may be selected from radical UV-curing initiators, including acetophenone-based UV-curing initiators, a-aminoacetophenone-based UV absorbents, acylphosphine oxide radical-based UV absorbents, O-acyloxime-based UV absorbents, titanocene-based UV-curing initiators, and bimolecular reaction UV-curing initiators. In case the polymerizing action is a cationic polymerization, the UV absorbent in the ink containing no polymerizable heat-producible composition may be selected from cationic UV-curing initiators.

As same as the ink containing a polymerizable heat-producible composition, the colorant in the ink containing no polymerizable heat-producible composition may be at least one of a pigment and a disperse dye.

An example of the image-printing irradiator 44 may be UV-LED (Light Emitting Diode). The wavelength of light radiated from the image-printing irradiator 44 may be between 250 nm and 400 nm. This corresponds to the range of wavelengths of light emission from semiconductor LEDs. LEDs of ultraviolet emission in the range of wavelengths from 360 nm to 400 nm may be readily available. The wavelength of light radiated from the image-printing irradiator 44, therefore, may desirably be between 360 nm and 400 nm.

The image-printing carriage 45 is supported so as to move in horizontal directions, i.e., a main scanning direction indicated with arrow 40b and a sub scanning direction orthogonal to the main scanning direction. The image-printing carriage 45 moving in these directions is allowed to horizontally move along the table 41.

The inkjet printer 40 has an adhesive-application carriage 48 mounted with an adhesive-application head 46 and an adhesive-application irradiator 47. The adhesive-application head 46 is an inkjet head from which an adhesive-containing ink 46a is discharged vertically downward. The adhesive-application irradiator 47 is an ultraviolet irradiation device that irradiates the adhesive-containing ink 46a discharged from the adhesive-application head 46 with ultraviolet light 47a.

Examples of the adhesive in the adhesive-containing ink 46a may include thermoplastic or thermosetting materials having thermo-bonding properties, such as butyral resins, epoxy resins, or urethane resins. As same as the image-printing inks 43a, the adhesive-containing ink 46a may be a UV instant-drying ink that can be instantly heated by ultraviolet irradiation to immediately vaporize the solvent contained in this ink. Such an ink may be quickly dried and fixed.

An example of the adhesive-application irradiator 47 may be a UV-LED irradiator. The wavelength of light radiated from the adhesive-application irradiator 47 may be between 250 nm and 400 nm. This corresponds to the range of wavelengths of light emission from semiconductor LEDs. LEDs of ultraviolet emission in the range of wavelengths of 360 nm to 400 nm may be readily available. The wavelength of light radiated from the adhesive-application irradiator 47, therefore, may desirably be between 360 nm and 400 nm.

The adhesive-application carriage 48 is supported so as to move in horizontal directions, i.e., the main scanning direction indicated with arrow 40b and the sub scanning direction orthogonal to the main scanning direction. The adhesive-application carriage 48 moving in these directions is allowed to horizontally move along the table 41.

Figure 4:
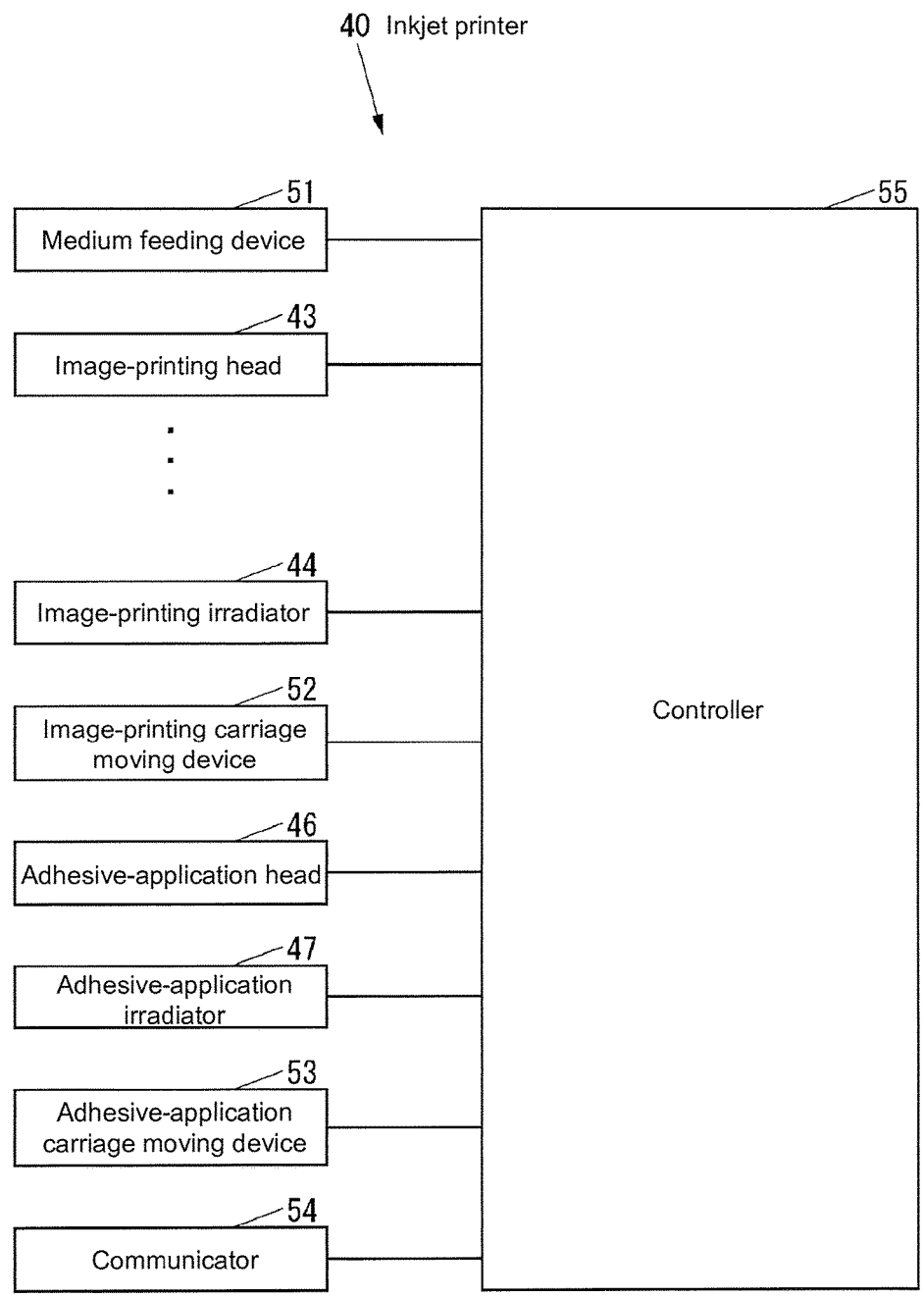
FIG. 4 is a block diagram of the inkjet printer illustrated in FIG. 3.

FIG. 4 is a block diagram of the inkjet printer 40.

As illustrated in FIG. 4, the inkjet printer 40 includes a medium feeding device 51, an image-printing carriage moving device 52, an adhesive-application carriage moving device 53, a communicator 54, and a controller 55. The medium feeding device 51 rotates the feed roller 42a (see FIG. 3) and the take-up roller 42b (see FIG. 3) to feed the permeable medium 12 (see FIG. 3) in the direction indicated with 40b (see FIG. 3). The image-printing carriage moving device 52 horizontally moves the image-printing carriage 45 (see FIG. 3). The adhesive-application carriage moving device 53 horizontally moves the adhesive-application carriage 48 (see FIG. 3). The communicator 54 communicates with an external device(s) through the network 11 (see FIG. 1) such as LAN or directly communicates with an external device(s) wirelessly or by cable without the intervention of the network 11. The controller 55 controls the whole inkjet printer 40.

The controller 55 includes CPU, ROM in which programs and data are prestored, and RAM used as the CPU's work area. The CPU runs the programs stored in the ROM.

Figure 5:
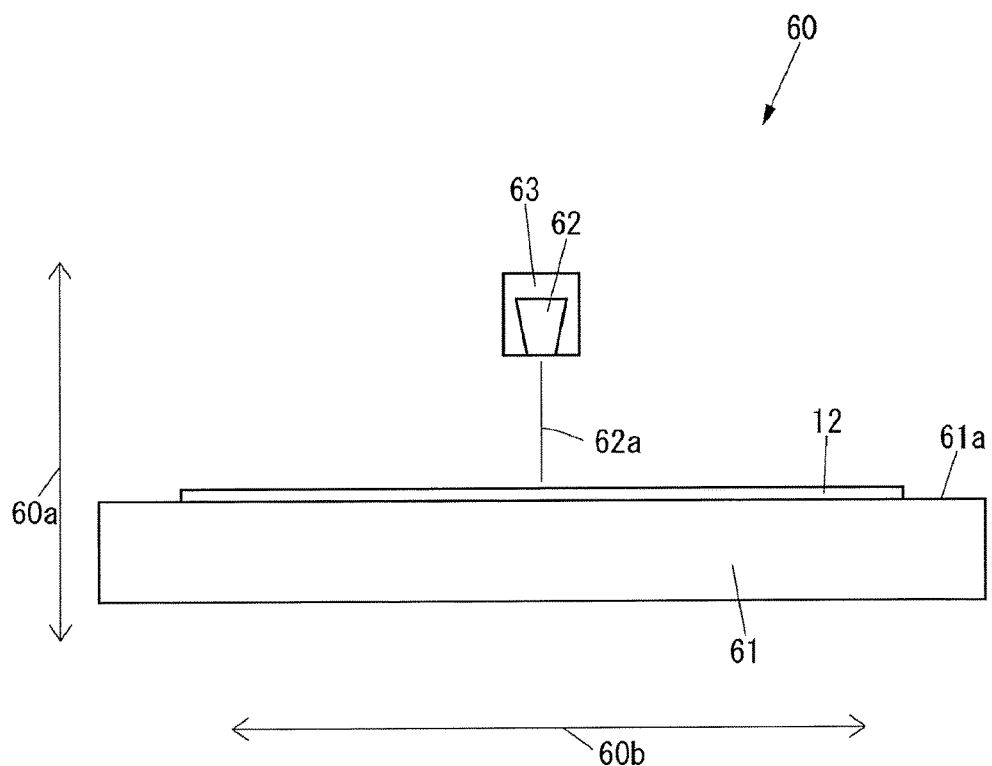
FIG. 5 is a schematic front view of a laser cutter illustrated in FIG. 1.

FIG. 5 is a schematic front view of the laser cutter 60.

As illustrated in FIG. 5, the laser cutter 60 has a table 61 and a carriage 63. The table 61 supports the permeable medium 12 from its underside in a vertical direction indicated with arrow 60a. The carriage 63 is mounted with a laser irradiator 62 that radiates laser light 62a to cut the permeable medium 12.

The table 61 has a support surface 61a for supporting the permeable medium 12. The support surface 61a extends in the horizontal direction orthogonal to the vertical direction.

The laser light 62a may be a pulse laser or a CW (Continuous Wave) laser.

The carriage 63 is supported so as to move in horizontal directions, i.e., a main scanning direction indicated with arrow 60b and a sub scanning direction orthogonal to the main scanning direction. The carriage 63 moving in these directions is allowed to horizontally move relative to the table 61.

When the permeable medium 12 is irradiated with laser light 62a, heat is generated. Then, the permeable medium 12 and/or the inks may be burnt or oxidized through heat-induced reactions with ambient gas. To avoid that, the permeable medium 12 may be cut in an inactive gas by the laser cutter 60 using a laser irradiator 62.

Figure 6:
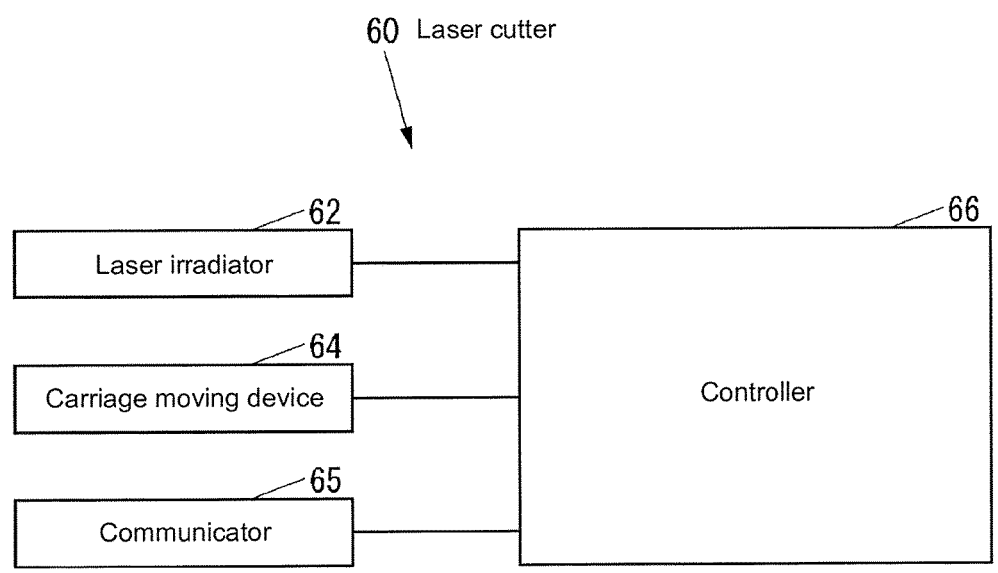
FIG. 6 is a block diagram of the laser cutter illustrated in FIG. 5.

FIG. 6 is a block diagram of the laser cutter 60.

As illustrated in FIG. 6, the laser cutter 60 has a carriage moving device 64, a communicator 65, and a controller 66. The carriage moving device 64 horizontally moves the carriage 63 (see FIG. 5). The communicator 54 communicates with an external device(s) through the network 11 (see FIG. 1) such as LAN or directly communicates with an external device(s) wirelessly or by cable without the intervention of the network 11. The controller 66 controls the whole laser cutter 60.

The controller 66 includes CPU, ROM in which programs and data are prestored, and RAM used as the CPU's work area. The CPU runs the programs stored in the ROM.

Figure 7:
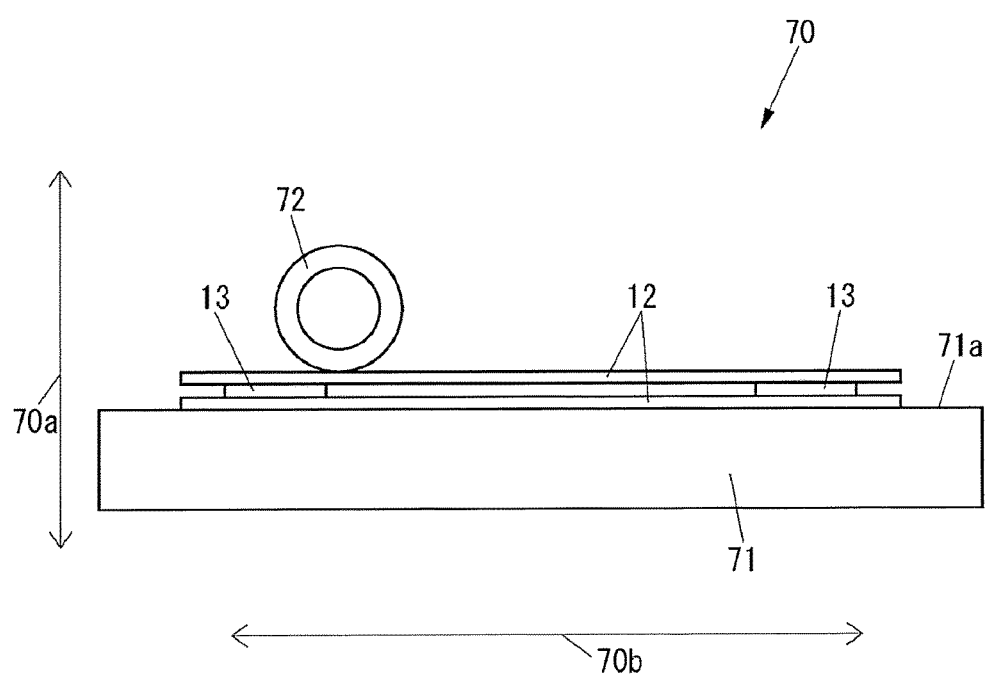
FIG. 7 is a schematic front view of a bonding apparatus illustrated in FIG. 1.

FIG. 7 is a schematic front view of the bonding apparatus 70.

As illustrated in FIG. 7, the bonding apparatus 70 includes a table 71 and a heat roller 72. The table 70 supports the permeable medium 12 applied with the adhesive 13 from its underside in a vertical direction indicated with arrow 70a. The heat roller 72 heats the adhesive 13 while nipping and pressing the permeable medium 12 against the table 71.

The table 71 has a support surface 71a on which the permeable medium 12 is supported. The support surface 71a extends in the horizontal direction orthogonal to the vertical direction.

The heat roller 72 is supported so as to move in a direction indicated with arrow 70b while rotating on a center axis extending in a direction orthogonal to the direction indicated with the arrow 70b.

Next, a manufacturing method using the manufacturing system 10 is hereinafter described.

Figure 8:
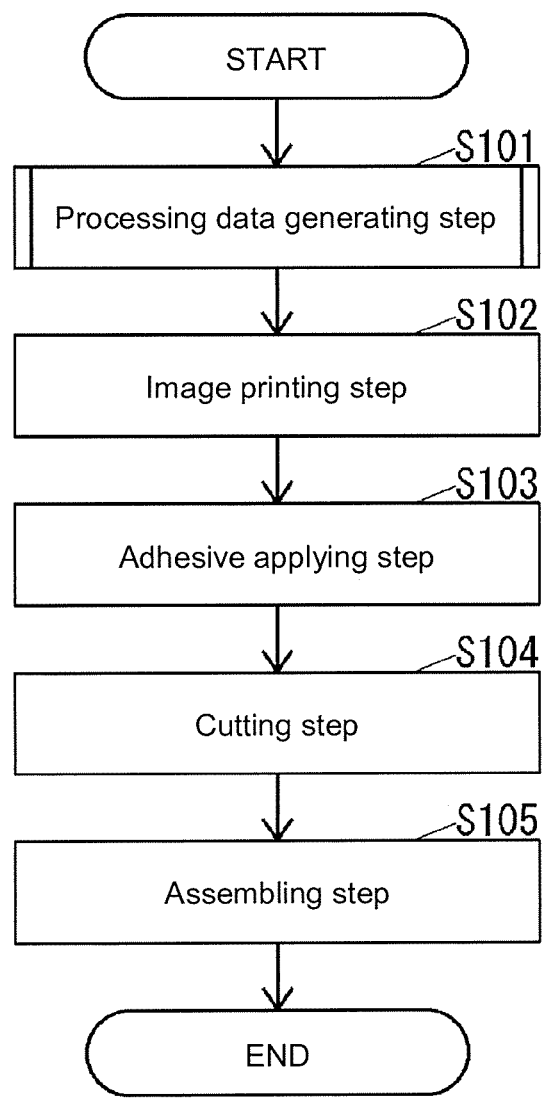
FIG. 8 is a flow chart of a manufacturing method using the manufacturing system illustrated in FIG. 1.

FIG. 8 is a flow chart of the manufacturing method using the manufacturing system 10.

First, a worker carries out a processing data generating step of generating a processing data 24b, as illustrated in FIG. 8 (S101).

Next, the worker carries out an image printing step of printing an image on the permeable medium 12 based on an image-printing data 24c of the processing data 24b generated in the processing data generating step S101 (S102).

Then, the worker carries out an adhesive applying step of applying an adhesive 13 to the permeable medium 12 based on an adhesive-application data 24d of the processing data 24b generated in the processing data generating step S101 (S103).

Then, the worker carries out a cutting step of cutting the permeable medium 12 into parts based on a cutting data 24e of the processing data 24b generated in the processing data generating step S101 (S104).

Lastly, the worker carries out an assembling step of assembling the parts obtained in the cutting step S104 into a permeable medium product (S105).

These steps are described below in further detail.

In the description below, as an example of a permeable medium product, a case of a vest which is a short body wear without sleeves is taken as an example.

The description starts with the processing data generating step S101.

Figure 9:
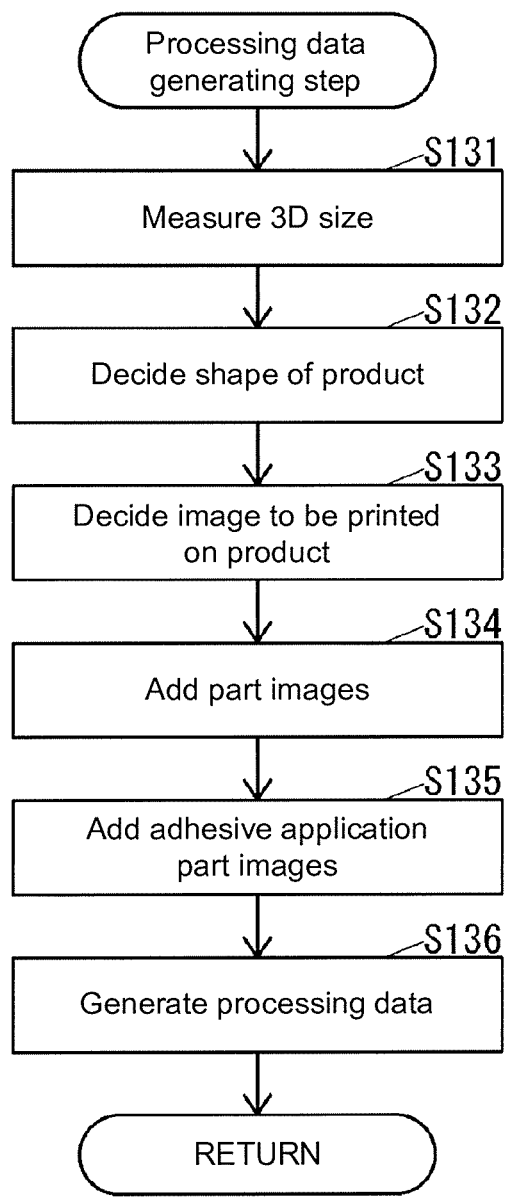
FIG. 9 is a flow chart of a processing data generating step illustrated in FIG. 8.

FIG. 9 is a flow chart of the processing data generating step S101.

As illustrated in FIG. 9, a worker measures a customer's 3D size (S131). The worker may measure the 3D size using the 3D scanner 30 or may measure the 3D size by hand using a tape measure.

After the step S131, the worker decides the vest's shape, on the screen of the displayer 22, of the computer 20 based on the 3D size measured in the step S131 and the customer's preference (S132). The worker, checking the three-dimensional image of the vest on the displayer 22 of the computer 20, may input an instruction to change the vest's shape via the operator 21 (see FIG. 2). In the step S132, the worker decides details on the vest's flared part and constricted part such as waist in accordance with dimensions of the three-dimensional image.

Figure 10A:
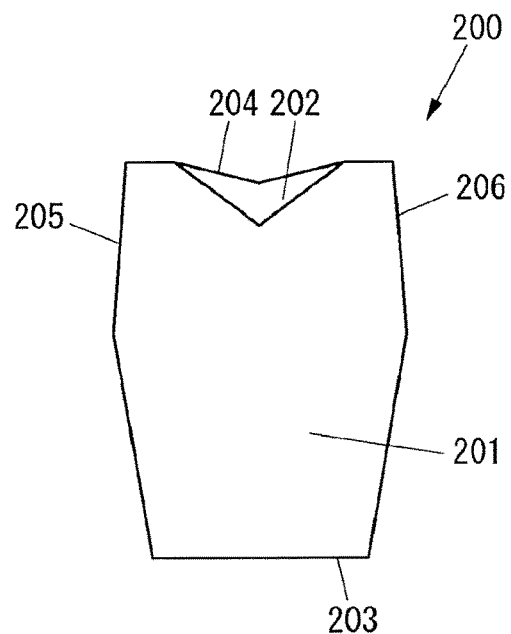
FIG. 10A is a drawing of a three-dimensional image of a vest viewed from its front side, whose shape was decided in the processing data generating step illustrated in FIG. 9.
Figure 10B:
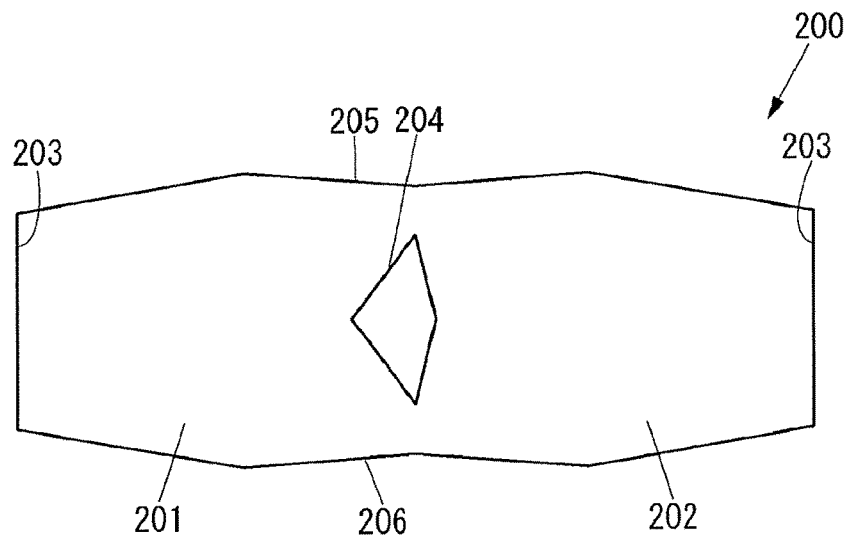
FIG. 10B is a drawing of a two-dimensionally laid out image of the vest illustrated in FIG. 10A.

FIG. 10A is a drawing of a three-dimensional image of a vest 200 viewed from its front side, whose shape was decided in the step S132. FIG. 10B is a two-dimensionally laid out image of the vest 200 illustrated in FIG. 10A. While FIG. 10B shows the front-side image alone, there may be a back-side image as well.

As illustrated in FIG. 10, the vest 200 has a front piece 201, a back piece 202, a hem 203, a collar 204, and arm insertions 205 and 206 through which right and left arms are inserted.

After the step S132, the worker decides, on the screen of the displayer 22, an image to be printed on the vest whose shape was decided in S132, as illustrated in FIG. 9 (S133). The worker, checking the vest's image on the displayer 22 of the computer 20, attach prepared parts of an image to be printed on the vest 200 and an image of the worker's own design to the vest, and edit positions, sizes, shapes, and colors of the image parts and the own designed image by manipulating the operator 21. In the step S133, the worker can check either one of the three-dimensional image and the two-dimensionally laid out image of the vest 200 on the screen of the displayer 22.

Figure 11A:
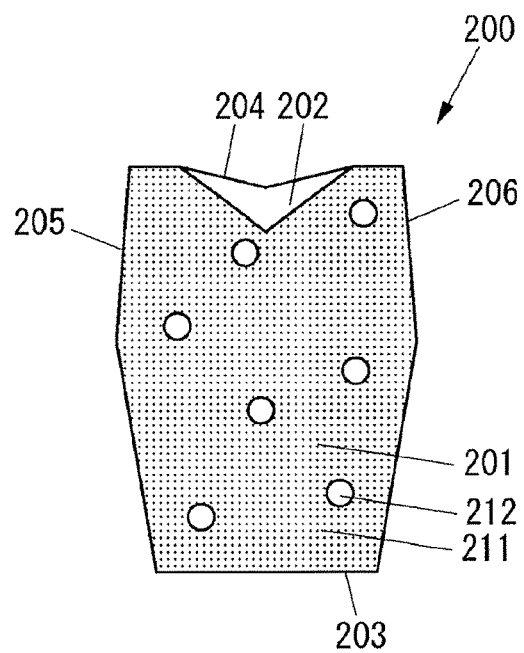
FIG. 11A is a drawing of a three-dimensional image of a designed vest viewed from its front side, which was obtained in the processing data generating step illustrated in FIG. 9.
Figure 11B:
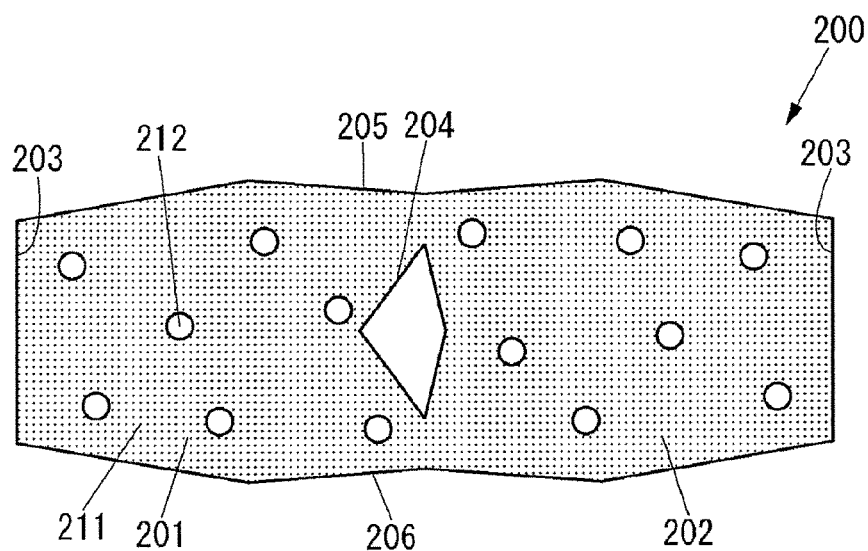
FIG. 11B is a two-dimensionally laid out image of the vest illustrated in FIG. 11A.

FIG. 11A is a drawing of a three-dimensional image of the designed vest 200 viewed from its front side, which was obtained in the step S133. FIG. 11B is a drawing of a two-dimensionally laid out image of the vest 200 illustrated in FIG. 11A. While FIG. 11B shows the front-side image alone, there may be a back-side image as well.

Referring to FIGS. 11A and 11B, a background image 211 and multiple circular images 212 have been added to the vest 200.

After the step S133, the worker adds images of parts to be attached (hereinafter, "part images") to the designed vest obtained in the step S133 on the screen of the displayer 22 (S134), as illustrated in FIG. 9. The parts to be attached may be cores for collar and sleeves, pockets, ribbons, buttons, and strings. In the step S134, the worker can check either one of the three-dimensional image and the two-dimensionally laid out image of the vest 200 on the screen of the displayer 22. In case the worker does not wish to attach such parts to the vest 200, the step S134 may be skipped.

Figure 12A:
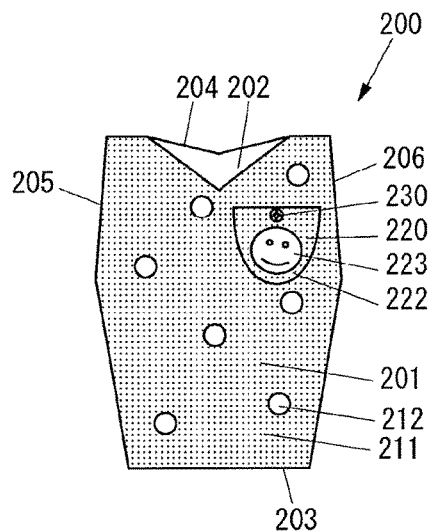
FIG. 12A is a drawing of a three-dimensional image of a designed vest viewed from its front side, to which images of parts were added in the processing data generating step illustrated in FIG. 9.
Figure 12B:
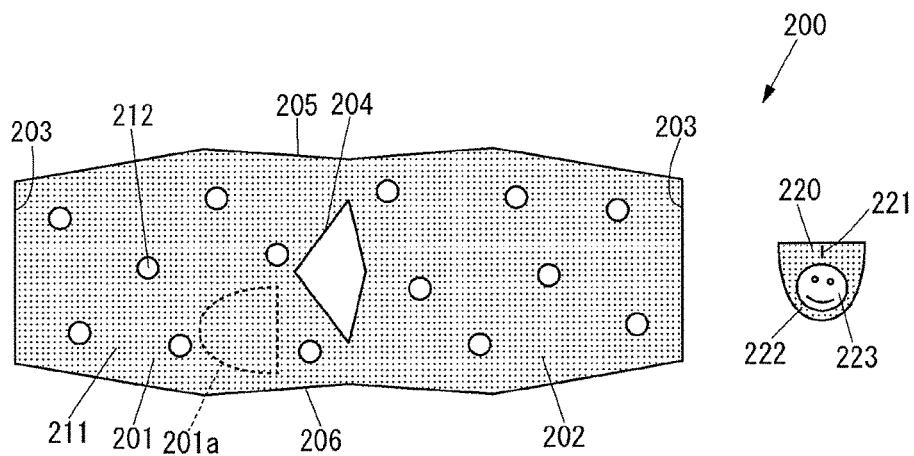
FIG. 12B is a two-dimensionally laid out image of the vest illustrated in FIG. 12A.

FIG. 12A is a drawing of a three-dimensional image of the designed vest 200 viewed from its front side, to which the part images were added in the step S134. FIG. 12B is a two-dimensionally laid out image of the vest 200 illustrated in FIG. 12A. While FIG. 12B shows the front-side image alone, there may be a back-side image as well.

Referring to FIGS. 12A and 12B, a pocket 220 has been added to the vest 200. In the two-dimensional image of the vest 200 illustrated in FIG. 12B, an image 201a has been added to the front piece 201, indicating the position of the pocket 220 to be attached. A button 230 has been added to the three-dimensional image of the vest 200 illustrated in FIG. 12A. In the two-dimensional image of the vest 200 illustrated in FIG. 12B, a button hole 221 for the button 230 has been added to the pocket 220. Further, a background image 222 and a face image 223 have been added to the pocket 220 of the vest 200 illustrated in FIGS. 12A and 12B.

After the step S134, the worker adds, on the screen of the displayer 22, images of adhesive application parts (hereinafter, "adhesive application part images") to the designed vest obtained in the step S134 (S135), as illustrated in FIG. 9. The worker adds the adhesive application part images to required positions on the peripheral edge of the two-dimensionally laid out image of the vest. The worker may check, on the screen of the displayer 22, the three-dimensional image of the vest to which the adhesive application part images have been added.

Figure 13A:
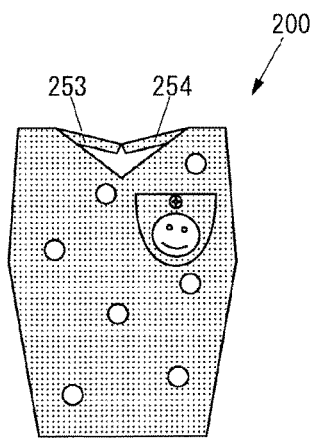
FIG. 13A is a drawing of a three-dimensional image of a designed vest viewed from its front side, to which the image of an adhesive-application part was added in the processing data generating step illustrated in FIG. 9.
Figure 13B:
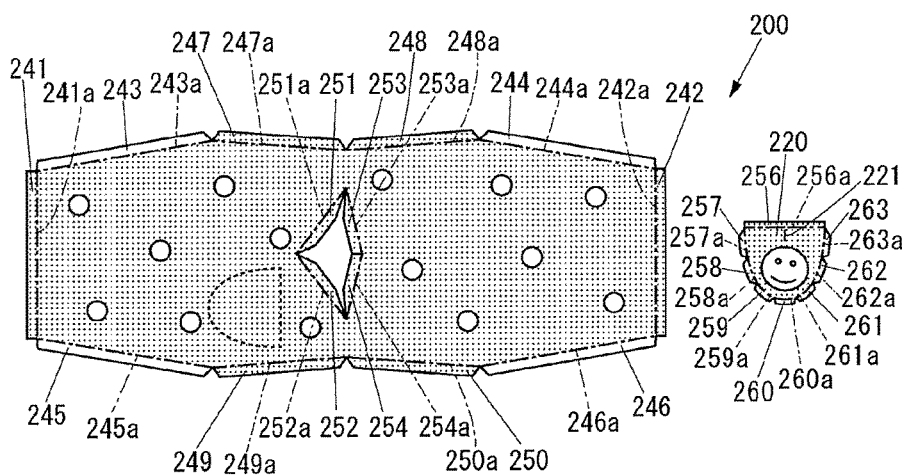
FIG. 13B is a two-dimensionally laid out of the vest illustrated in FIG. 13A.

FIG. 13A is a drawing of a three-dimensional image of the designed vest 200 viewed from its front side, to which the adhesive application part images were added in the step S135. FIG. 13B is a two-dimensionally laid out image of the best 200 illustrated in FIG. 13A. While FIG. 13B shows the front-side image alone, there may be a back-side image as well.

Referring to FIGS. 13A and 13B, adhesive application parts 241 to 254 and 256 to 263 have been added to the vest 200, and a background image has been added to the adhesive application parts 241, 242, 247 to 254, and 256.

The adhesive application part 241 includes a fold line 241a. Likewise, the adhesive application parts 242 to 254 and 256 to 263 include fold lines 242a to 254a and 256a to 263a. The fold lines 241a to 254a and 256a to 263a are all mountain fold lines. The fold lines may possibly include valley fold lines. The fold lines may be differently drawn depending on whether they are mountain fold or valley fold lines. For example, a mountain fold line may be an alternate long and short dash line, while a valley fold line may be a two-dot chain line.

Figure 14A:
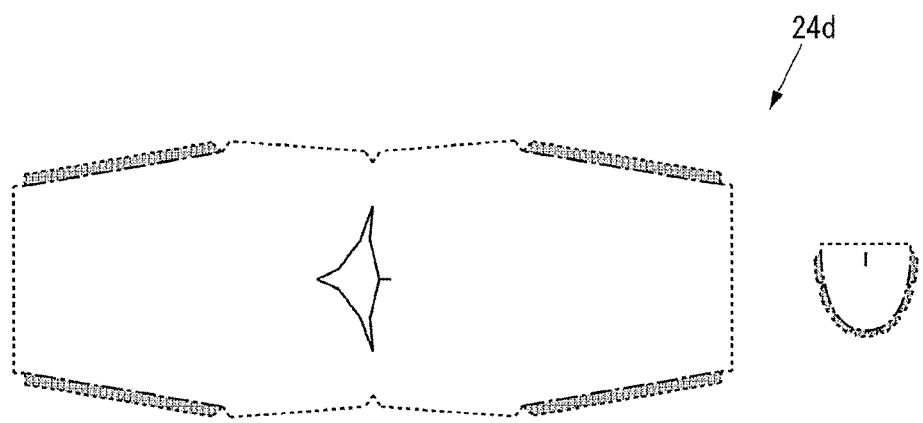
FIG. 14A is a drawing of adhesive-application data for the vest's front surface illustrated in FIG. 13B.
Figure 14B:
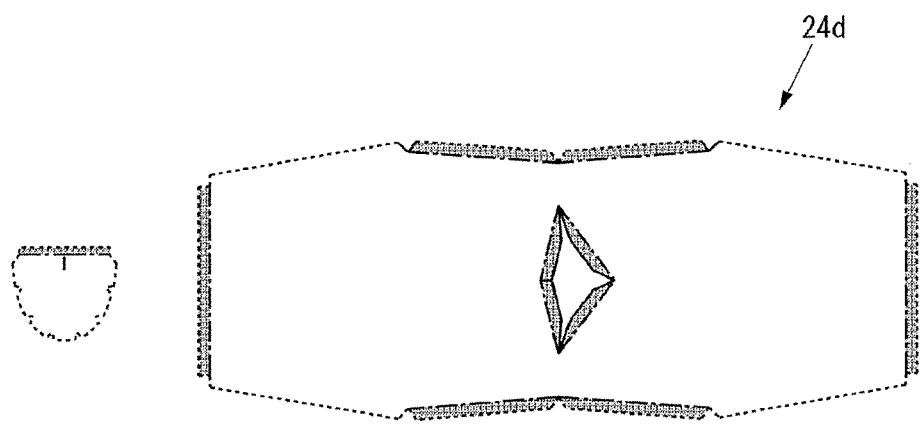
FIG. 14B is a drawing of adhesive-application data for the vest's back surface of the vest illustrated in FIG. 13B.
Figure 15:
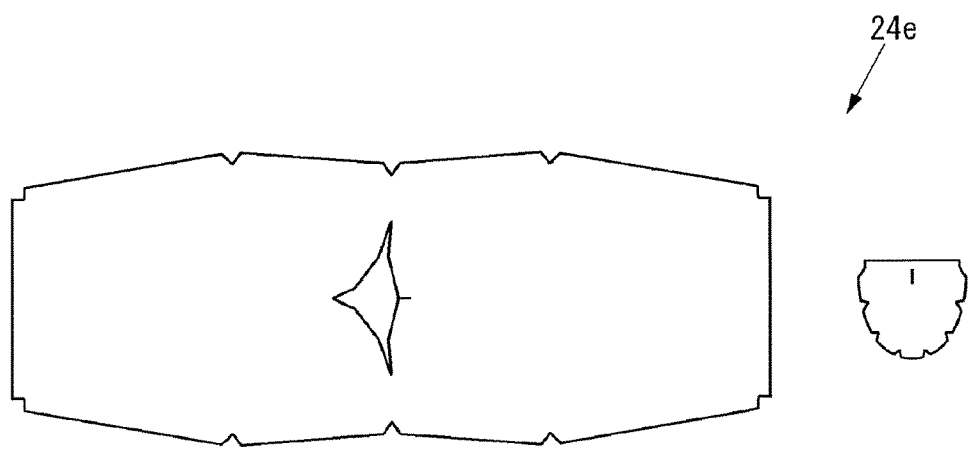
FIG. 15 is a drawing of cutting data for the vest illustrated in FIG. 13B.

FIG. 14A is a drawing of adhesive-application data 24d for the front surface of the vest 200 illustrated in FIG. 13B. FIG. 14B is a drawing of adhesive-application data 24d for the back surface of the vest 200 illustrated in FIG. 13B. FIG. 15 is a drawing of cutting data 24e for the vest 200 illustrated in FIG. 13B.

The step S135 generates, as well as the image-printing data 24c (see FIG. 2) used to print an image on the vest 200 as illustrated in FIG. 13B, the adhesive-application data 24d illustrated in FIGS. 14A and 14B, and the cutting data 24e illustrated in FIG. 15. In the adhesive-application data 24d, darkened parts, as illustrated in FIGS. 14A and 14B, are parts to which the adhesive should be applied. The cutting data 24e indicates a line on the peripheral edge of the image illustrated in FIG. 13B.

The worker may change the decision made in the step S132 at an optional point in time after the step S132 is over. The worker may change the decisions made in the steps S133 to S135 at an optional point in time after a respective one of these steps is over. By inputting an instruction to finalize the decisions made in the steps S132 to S135 using the operator 21, the worker prompts the computer 20 to generate the processing data 24b (see FIG. 2) of an originally designed vest that fits the customer's 3D size (S136). The processing data 24b includes the image-printing data 24c, adhesive-application data 24d, and cutting data 24e.

Next, the image printing step S102 is described.

The worker may input, to the computer 20 via the operator 21, an instruction to transmit the image-printing data 24c included in the processing data 24b generated in the processing data generating step S101 to the inkjet printer 40. Upon receipt of the instruction inputted by the worker, the image printer 25b of the computer 20 transmits the image-printing data 24c to the inkjet printer 40 through the communicator 23.

The worker may input the image-printing data 24c generated by the computer 20 to the inkjet printer 40 from a storage medium, for example, USB memory.

Upon receipt of the image-printing data 24c inputted through the communicator 54, the controller 55 of the inkjet printer 40 controls the image-printing heads 43, image-printing irradiator 44, and image-printing carriage moving device 52 based on the inputted image-printing data 24c. Specifically, for each position change by the image-printing carriage moving device 52 of the image-printing carriage 45 in the sub scanning direction relative to the table 41, the controller 55, while moving the image-printing carriage 45 in the main scanning direction using the image-printing carriage moving device 52, prompts the image-printing heads 43 and the image-printing irradiator 44 to discharge and dry the image-printing inks 43a to print an image on the permeable medium 12. In the inkjet printer 40, the image-printing inks 43a discharged from the image-printing heads 43 onto the permeable medium 12 are immediately irradiated with ultraviolet light of a predefined intensity radiated from the image-printing irradiator 44 to instantly dry and cure the image-printing inks 43a. As a result, an image based on the image-printing data 24c is printed on the permeable medium 12.

In the inkjet printer 40, the image-printing inks 43a thus instantly cured may be difficult to smear on the permeable medium 12. This may spare the permeable medium 12 from any pretreatment and after-treatment. For example, pretreatment performed to prevent smearing of the inks may be coating the permeable medium with a pretreatment agent primarily consisting of an adhesive, for example, water-soluble starch, chitosan, or polyvinyl alcohol resin. Such a pretreatment, however, may be unnecessary for the permeable medium 12.

In case the image-printing data 24c is configured to print an image(s) on both surfaces of the permeable medium 12, the image(s) is printed on the both surfaces based on the image-printing data 24c.

Figure 16:
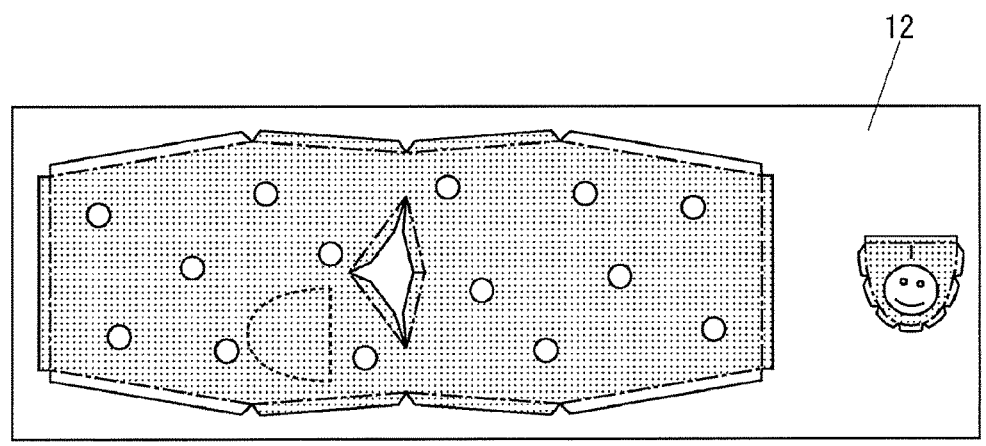
FIG. 16 is a front view of a permeable medium on which images illustrated in FIG. 13B are printed based on image-printing data

FIG. 16 is a front view of the permeable medium 12 on which the image illustrated in FIG. 13B is printed based on the image-printing data 24c.

In the image printing step S102, an image based on the image-printing data 24c is printed on the permeable medium 12, as illustrated in FIG. 16. While FIG. 16 shows the front-side image alone, an image may be printed on the back surface as well.

Next, the adhesive applying step S103 is described.

The worker may input, to the computer 20 via the operator 21, an instruction to transmit the adhesive-application data 24d included in the processing data 24b generated in the processing data generating step S101 to the inkjet printer 40. Upon receipt of the instruction inputted by the worker, the adhesive applier 25c of the computer 20 transmits the adhesive-application data 24d to the inkjet printer 40 through the communicator 23.

The worker may input the adhesive-application data 24d generated by the computer 20 to the inkjet printer 40 from a storage medium, for example, USB memory.

Upon receipt of the adhesive-application data 24d inputted through the communicator 54, the controller 55 of the inkjet printer 40 controls the adhesive-application head 46, adhesive-application irradiator 47, and adhesive-application carriage moving device 53 based on the inputted adhesive-application data 24d. Specifically, for each position change by the adhesive-application carriage moving device 53 of the adhesive-application carriage 48 in the sub scanning direction relative to the table 41, the controller 55, while moving the adhesive-application carriage 48 in the main scanning direction using the adhesive-application carriage moving device 53, prompts the adhesive-application head and the adhesive-application irradiator 47 to discharge and dry the adhesive-containing ink 46a at positions on the permeable medium 12 indicated by the adhesive-application data 24d. In the inkjet printer 40, the adhesive-containing ink 46a discharged from the adhesive-application head 46 onto the permeable medium 12 is immediately irradiated with ultraviolet light of a predefined intensity radiated from the adhesive-application irradiator 47 to instantly dry and cure the adhesive-containing ink 46a. As a result, the adhesive is applied to the positions indicated by the adhesive-application data 24d.

In the inkjet printer 40, the adhesive-containing ink 46a thus instantly cured may be difficult to smear on the permeable medium 12. This may spare the permeable medium 12 from any pretreatment and after-treatment.

In case the adhesive-application data 24d is configured to apply the adhesive to both surfaces of the permeable medium 12, the adhesive is applied to the both surfaces.

The adhesive-containing ink 46a is not necessarily a UV instant-drying ink, because accuracy expected of the image printed on the vest 200 is not required of the adhesive. This ink may be selected from other suitable adhesive-containing inks containing adhesive, for example, conventional adhesive-containing UV inks and conventional adhesive-containing, solvent-diluted UV inks. The UV instant-drying ink contains a high percentage of solvent vaporized before the ink is cured. This ink is, therefore, reduced in thickness after curing. The conventional UV inks containing less solvent than the UV instant-drying ink may be greater in thickness after curing than the instant-dry UV ink. A solvent-diluted conventional UV ink containing less solvent than the instant-dry UV ink may be greater in thickness after curing than the UV instant-drying ink. The solvent-diluted conventional UV ink having a greater content of solvent than the conventional UV inks may be smaller in thickness after curing than the conventional UV inks. The adhesive-containing ink 46a used in parts that allow for large adhesive thicknesses, such as collar or sleeves, may be a conventional UV ink or a solvent-diluted conventional UV ink.

Figure 17:
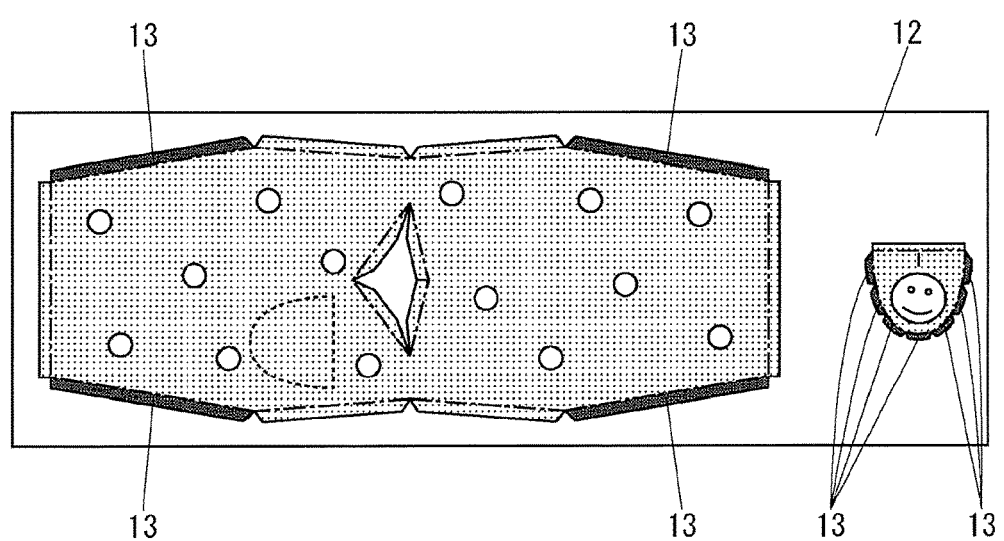
FIG. 17 is a front view of the permeable medium illustrated in FIG. 16 after an adhesive is applied thereto based on the adhesive-application data illustrated in FIG. 14A.

FIG. 17 is a front view of the permeable medium 12 illustrated in FIG. 16 after the adhesive 13 is applied thereto based on the adhesive-application data 24d of FIG. 14A.

In the adhesive applying step S103, the adhesive 13 is applied to positions indicated by the adhesive-application data 24d, as illustrated in FIG. 17. Referring to FIG. 17, the adhesive 13 is applied to darkened parts. While FIG. 17 shows the front surface alone, the adhesive 13 may be applied to the back surface as well.

Next, the cutting step S104 is described.

The worker may input, to the computer 20 via the operator 21, an instruction to transmit the cutting data 24e included in the processing data 24b generated in the processing data generating step S101 to the laser cutter 60. Upon receipt of the instruction inputted by the worker, the cutter 25d of the computer 20 transmits the cutting data 24e to the laser cutter 60 through the communicator 23.

The worker may input the cutting data 24e generated by the computer 20 to the laser cutter 60 from a storage medium, for example, USB memory.

Upon receipt of the cutting data 24e inputted through the communicator 65, the controller 66 of the laser cutter 60 controls the laser irradiator 62 and the carriage moving device 64 based on the inputted cutting data 24e. Specifically, for each position change by the carriage moving device 64 of the carriage 63 in the sub scanning direction relative to the table 61, the controller 66, while moving the carriage 63 in the main scanning direction using the carriage moving device 64, prompts the laser irradiator 62 to cut the permeable medium 12 in accordance with the cutting data 24e.

Figure 18:
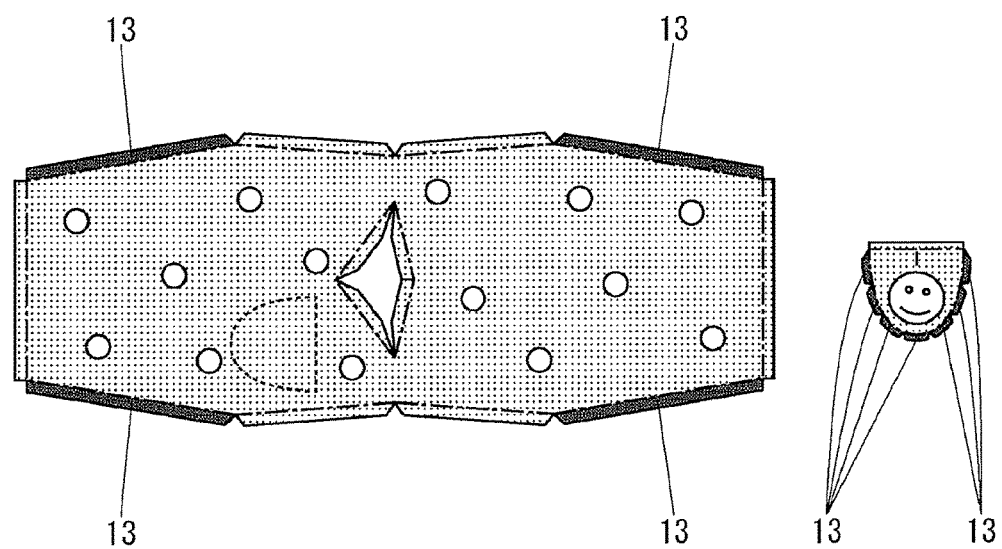
FIG. 18 is a front view of parts cut out from the permeable medium illustrated in FIG. 17 based on the cutting data illustrated in FIG. 15.

FIG. 18 is a front view of parts cut out from the permeable medium 12 illustrated in FIG. 17 based on the cutting data 24e of FIG. 15.

In the cutting step S104, the permeable medium 12 is cut in accordance with the cutting data 24e, as illustrated in FIG. 18.

In the cutting step S104, any suitable devices but the laser cutter 60 may be used to cut out the parts from the permeable medium 12. For instance, the worker may manually cut out the parts using scissors along the peripheral edge of the image on the permeable medium 12 illustrated in FIG. 17. In case the worker decides to cut the medium using scissors, the cutting data 24e is unnecessary.

Next, the assembling step S105 is described.

The worker folds the parts obtained in the cutting step S104 along the fold lines, and bonds the parts applied with the adhesive 13 by thermocompression using the bonding apparatus 70, so as to complete the manufacture of a permeable medium product.

In the assembling step S105, any suitable devices but the bonding apparatus 70 may be used for thermocompression bonding of the parts applied with the adhesive 13. For instance, the worker may use a hand-held clothes iron to bond the parts by thermocompression.

In the assembling step S105, the parts of FIG. 18 may be put together as illustrated in FIG. 13A.

In the assembling step S105, the parts may be sewed by hand or a sewing machine, if necessary, to strengthen the adhesion parts applied with the adhesive 13.

A button hole 221 (see FIGS. 12A and 12B) is formed in the vest 200 illustrated in FIG. 13A. The button hole 221 may be strengthened by strengthening parts 271 and 272 illustrated in FIGS. 19A and 19B.

Figure 19A:
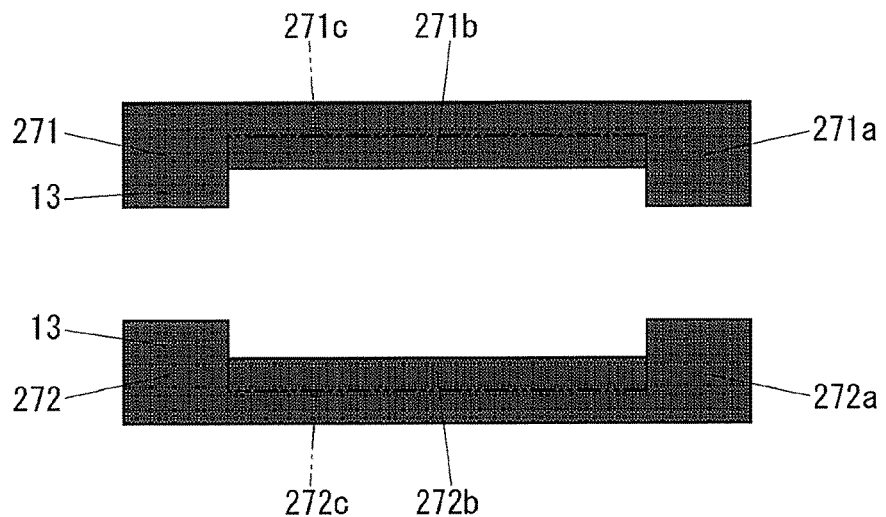
FIG. 19A is a front view of strengthening parts used to strengthen a button hole illustrated in FIGS. 12A and 12B.
Figure 19B:
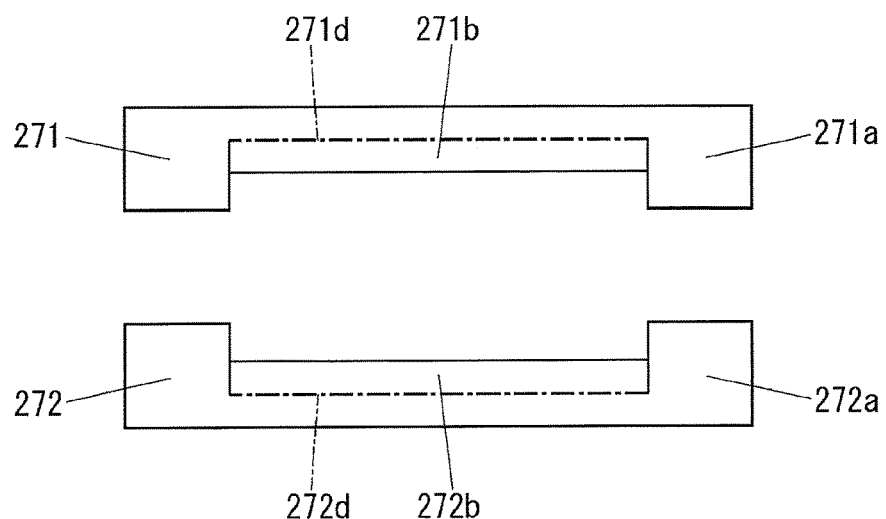
FIG. 19B is a back view of the strengthening parts illustrated in FIG. 19A.

FIG. 19A is a front view of the strengthening parts 271 and 272 used to strengthen the button hole 221. FIG. 19B is a back view of the strengthening parts 271 and 272.

As illustrated in FIGS. 19A and 19B, the adhesive 13 has been applied to all over the front surfaces of the strengthening parts 271 and 272. The strengthening part 271 includes a body 271a to be bonded to the back surface of the pocket 220 (see FIGS. 12A and 12B) with the button hole 221, and a tongue 271b to be bonded to the front surface of the pocket 220. The tongue 271b is integral with the body 271a. On the front-surface side of the strengthening part 271, a valley fold line 271c is drawn on the joint of the body 271a and the tongue 271b. On the back-surface side of this part, a mountain fold line 271d is drawn on the joint of the body 271a and the tongue 271b. The strengthening part 272 includes a body 272a to be bonded to the back surface of the pocket 220 with the button hole 221, and a tongue 272b to be bonded to the front surface of the pocket 220. The tongue 272b is integral with the body 272a. On the front-surface side of the strengthening part 272, a valley fold line 272c is drawn on the joint of the body 272a and the tongue 272b. On the back-surface side of this part, a mountain fold line 272d is drawn on the joint of the body 272a and the tongue 272b.

Figure 20A:
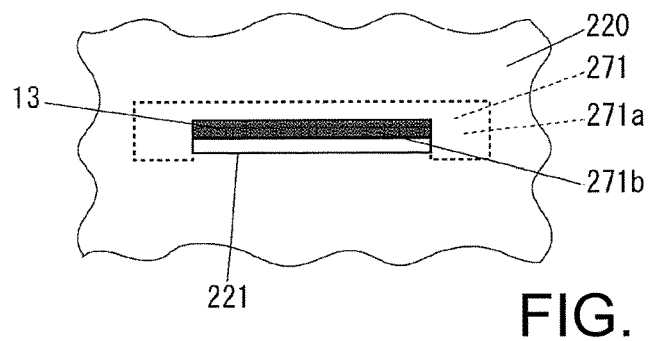
FIG. 20A is a front view of a pocket after a tongue of one of the strengthening parts of FIGS. 19A and 19B is inserted in the button hole.
Figure 20B:
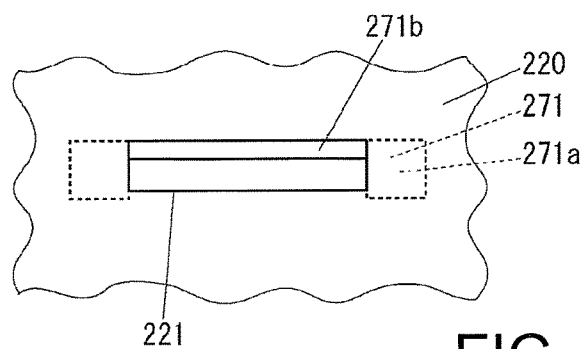
FIG. 20B is a front view of the pocket after one of the strengthening parts illustrated in FIGS. 19A and 19B is bonded thereto.
Figure 20C:
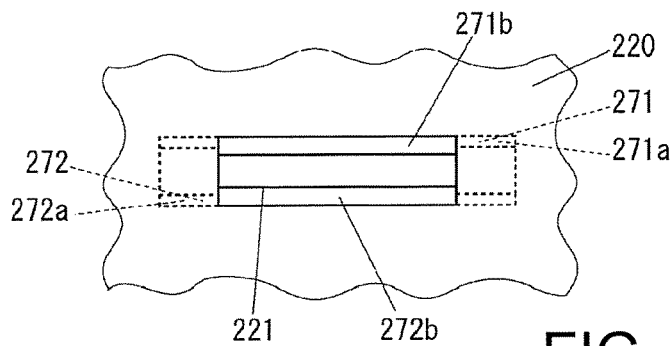
FIG. 20C is a front view of the pocket after the other one of the strengthening parts illustrated in FIGS. 19A and 19B is bonded thereto.
Figure 20D:
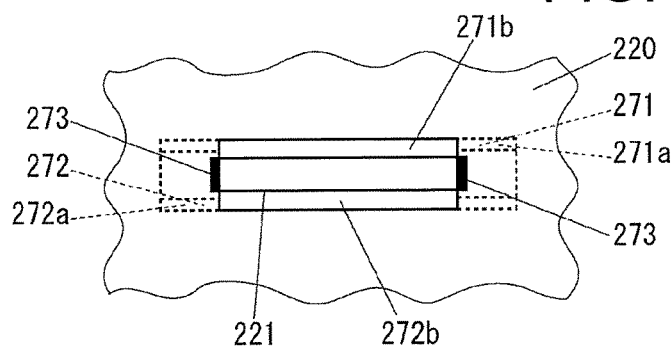
FIG. 20D is a front view of the pocket having the button hole strengthened by the two strengthening parts illustrated in FIGS. 19A and 19B.

FIG. 20A is a front view of the pocket 220 in which the tongue 271b of the strengthening part 271 has been inserted in the button hole 221. FIG. 20B is a front view of the pocket 220 to which the strengthening part 271 has been bonded. FIG. 20C is a front view of the pocket 220 to which the strengthening part 272 has been bonded. FIG. 20D is a front view of the pocket 220 in which the button hole 221 has been strengthened by the two strengthening parts 271 and 272.

As illustrated in FIG. 20A, the tongue 271b of the strengthening part 271 is inserted in the button hole 221 from the back surface of the pocket 220. After the tongue 271b is valley folded, i.e., folded forward with the fold line 271c (FIG. 19A) at the bottom, the pocket 220 and the strengthening part 271 are bonded by thermocompression with the adhesive 13 of the strengthening part 271 (FIG. 19A), as illustrated in FIG. 20B. As same as the strengthening part 271, the pocket 220 and the strengthening part 272 are bonded by thermocompression with the adhesive 13 of the strengthening part 272, as illustrated in FIG. 20C.

Lastly, ends on both sides of the button hole 221 in its lengthwise direction are sewed with threads to form a thread-sewed strengthening part 273, as illustrated in FIG. 20D.

FIGS. 21A to 21H are drawings of different bonding patterns of the permeable medium 12 using the adhesive 13 in the manufacturing method according to this embodiment.

Figure 21A:
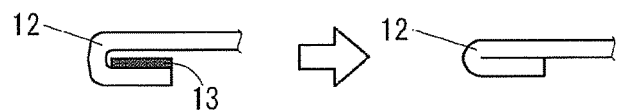
FIGS. 21A to 21H are drawings of different adhesive-bonding patterns of the permeable medium in the manufacturing method using the manufacturing system illustrated in FIG. 1.
Figure 21B:
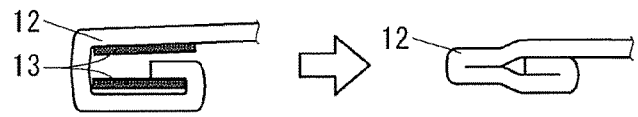
Figure 21C:
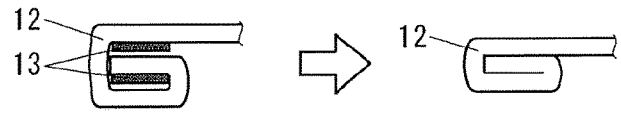
Figure 21D:
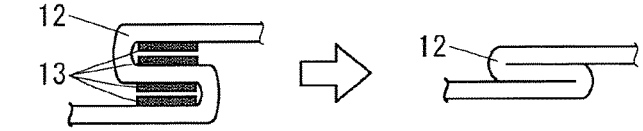
Figure 21E:
Figure 21F:
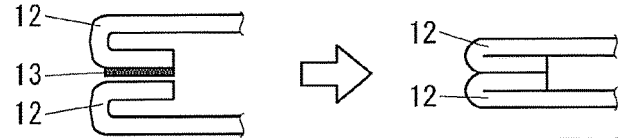
Figure 21G:
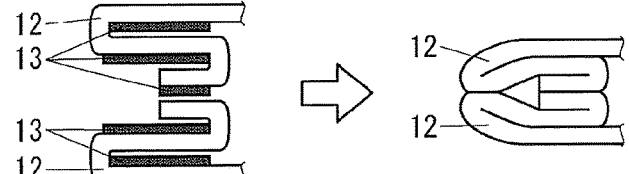
Figure 21H:
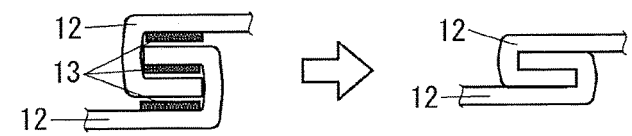

In the drawings of FIGS. 21A to 21H, the parts before bonding are illustrated on the left side, while the parts after bonding are illustrated on the right side. FIGS. 21A to 21C illustrate patterns of finishing the edge of one permeable medium 12. FIG. 21D illustrates a bonding pattern at different parts than the edge of one permeable medium 12. FIGS. 21E to 21H illustrate bonding patterns of two permeable media 12. Depending on how to finish the edge of one permeable medium 12, how to bond different parts than the edge of one permeable medium 12, or how to bond two permeable media 12, any suitable one may be selected from the bonding patterns of the permeable medium 12 using the adhesive 13. The bonding patterns of the permeable medium 12 using the adhesive 13 can also be selected depending on the required strength. There are other bonding patterns of the permeable medium 12 using the adhesive 13, apart from the ones illustrated in FIGS. 21A to 21H.

Figure 22A:
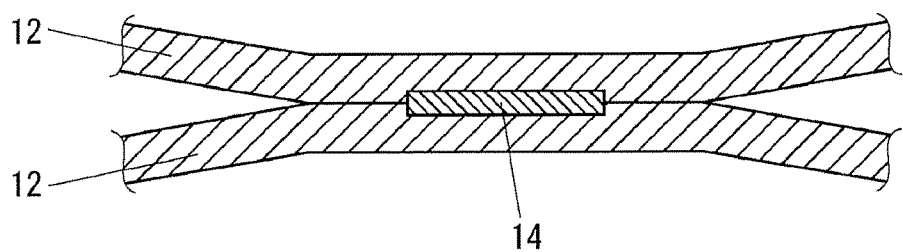
FIG. 22A is a cross-sectional view in part of two permeable media bonded to each other in the manufacturing method using the manufacturing system illustrated in FIG. 1.
Figure 22B:
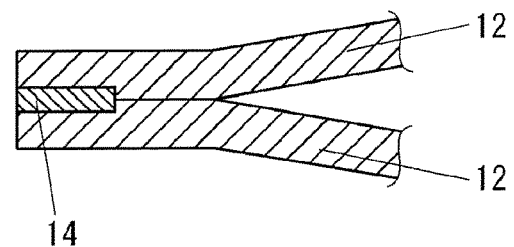
FIG. 22B is a cross-sectional view in part of two permeable media cut at an intermediate position in their bonded parts illustrated in FIG. 22A.

FIG. 22A is a cross-sectional view in part of two permeable media 12 bonded to each other in the manufacturing method according to an embodiment. FIG. 22B is a cross-sectional view in part of two permeable media 12 cut at an intermediate position in their bonded parts 14.

As illustrated in FIG. 22A, two permeable media 12 are bonded to each other with an adhesive. FIG. 22A illustrates the two permeable media 12 bonded at their bonded parts 14. As illustrated in FIG. 22B, the permeable media 12 are cut with the laser cutter 60 or scissors at an intermediate position in the bonded parts 14. In the two permeable media 12 illustrated in FIG. 22B their edges with the bonded parts 14 may be difficult to fray.

In addition to the vest 200 described so far, the manufacturing system 10 may be used to manufacture variously different permeable medium products. The other permeable medium products manufacturable by the manufacturing system 10 may range in various articles, such as clothes other than vests, scarves, fancy goods such as handkerchief, curtains, ornaments, and toys. The manufacturing system 10 may be usable in on-demand manufacture of a diverse range of permeable medium products, including apparel products, fashion products, and textile products.

Figure 23A:
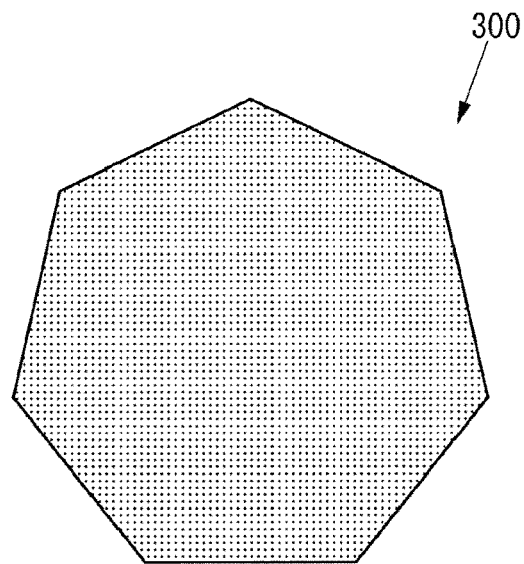
FIG. 23A is an upper view of a rug manufactured by the manufacturing system illustrated in FIG. 1.
Figure 23B:
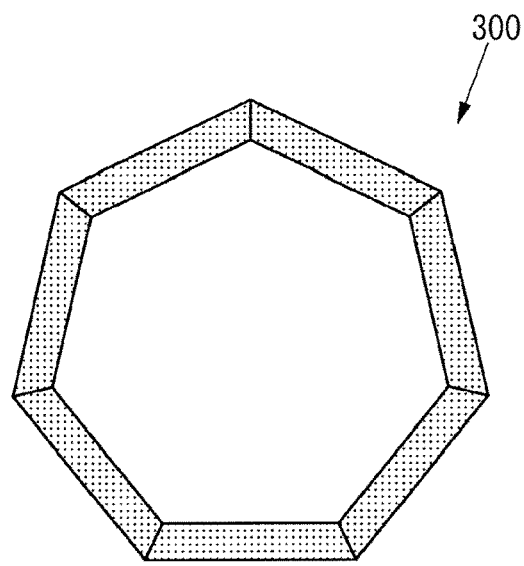
FIG. 23B is a bottom view of the rug illustrated in FIG. 23A.

For instance, the permeable medium product manufactured by the manufacturing system 10 may be a heptagonal textile rug 300 illustrated in FIGS. 23A and 23B.

Figure 24A:
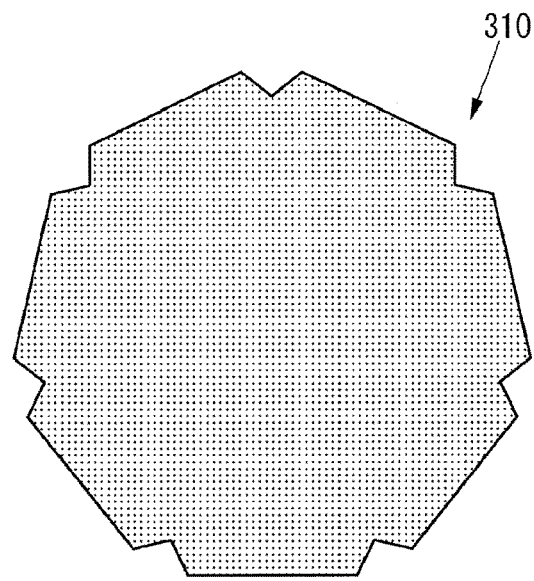
FIG. 24A is an upper view of parts of the rug illustrated in FIGS. 23A and 23B before they are assembled.
Figure 24B:
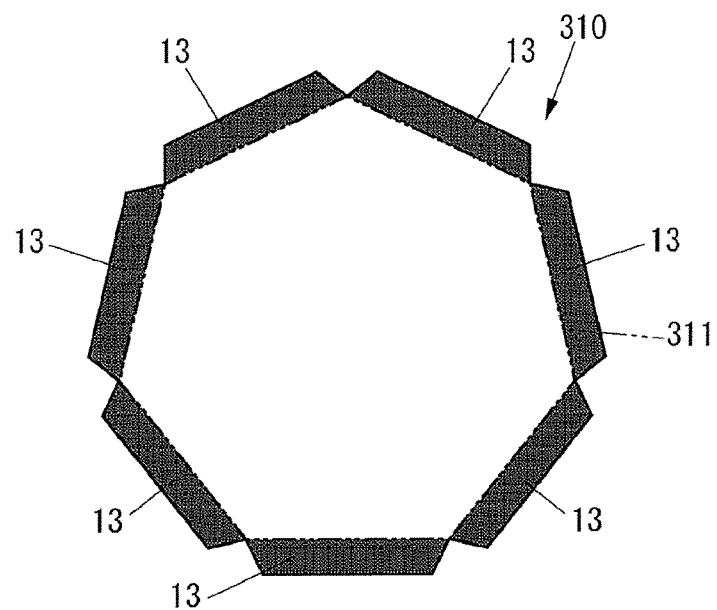
FIG. 24B is a bottom view of the parts illustrated in FIG. 24A.

FIG. 23A is an upper view of the rug 300. FIG. 23B is a bottom view of the rug 300. FIG. 24A is an upper view of parts 310 of the rug 300 before they are assembled. FIG. 24B is a bottom view of the parts 310.

In the cutting step S104, the parts 310 illustrated in FIGS. 24A and 24B are obtained. The adhesive 13 has been applied to part of the back surfaces of the parts 310. On the back surfaces of the parts 310 is drawn a valley fold line 311.

After the parts are valley folded, i.e., folded forward with the fold line 311 at the bottom, by the worker bonds the parts applied with the adhesive 13 by thermocompression using the bonding apparatus 70, so as to finalize the manufacture of the rug 300 illustrated in FIGS. 23A and 23B.

Thus, the manufacturing method according to this embodiment forms an image by inkjet printing on the permeable medium 12 based on the processing data 24b (S102), cuts the image-printed permeable medium 12 into parts in shapes based on the processing data 24*b* (S104), and puts together the parts into a product (S105). According to this method, a permeable medium product with an optional image printed thereon may be manufactured in an optional shape on an on-demand basis. The manufacturing method according to this embodiment may improve the degree of freedom in designing and manufacturing a permeable medium product.

The manufacturing method according to this embodiment applies the adhesive 13 to the permeable medium 12 based on the processing data 24*b* (S103), cuts the permeable medium applied with the adhesive 13 into parts in shapes based on the processing data 24*b* (S104), and puts together the parts into a product (S105). According to this method, a permeable medium product may be manufactured in an optional shape on an on-demand basis. This manufacturing method may curtail steps in the manufacture of a permeable medium product and improve the degree of freedom in designing the product.

In the manufacturing method according to this embodiment, the parts bonded with the adhesive 13 may require no sewing. This may facilitate the manufacture of a permeable medium product, allowing any unskilled person to easily make, for example, clothes. The manufacturing method according to this embodiment may allow an worker with no sewing skills to easily make originally-designed permeable medium products on an on-demand basis.

When shape-retaining main parts alone are selected from all of the cut parts and bonded, a preliminary design, shape, pattern, and/or layout may be checked on a person or a dummy, like tacking conventionally performed to make sewn products. By bonding all of the parts after the selected parts are checked, errors may be avoidable, for example, the parts bonded with displacement or bonded at wrong positions.

The image-printing ink 43*a* is irradiated with ultraviolet light 44*a* and thereby instantly heated to immediately vaporize the solvent contained in this ink. Thus, the image-printing ink 43*a* may be quickly dried and fixed. The manufacturing method according to this embodiment, without exercising a special treatment, for example, pretreatment to the permeable medium 12, may allow a vivid image to be directly printed on the permeable medium 12 on an on-demand basis using the image-printing ink 43*a* less likely to smear on the medium. This may allow for more options of the permeable medium 12.

The adhesive-containing ink 46*a* is irradiated with ultraviolet light 47*a* and thereby instantly heated to immediately vaporize the solvent contained in this ink. Thus, the adhesive-containing ink 46*a* may be quickly dried and fixed. The manufacturing method according to this embodiment, without exercising a special treatment, for example, pretreatment to the permeable medium 12, may prevent smearing of the adhesive-containing ink 46*a* and allow the adhesive 13 to be accurately applied to desired positions.

The manufacturing method according to this embodiment may dispense with a special treatment, for example, pretreatment for the permeable medium 12. This method, therefore, may reduce manufacturing time and cost.

Conventional devices adapted for pretreatment are mostly directed to large-sized permeable media. Such devices are often unsuited for small permeable media. The manufacturing method according to this embodiment may dispense with a special treatment, for example, pretreatment for the permeable medium 12. This method, therefore, may successfully manufacture products using small permeable media that may be in the worker's possession.

The manufacturing method according to this embodiment spare the permeable medium 12 from a special treatment, for example, pretreatment. This method, therefore, may be fee of waste fluid that would otherwise be generated to remove a pretreatment agent from the permeable medium, thus preventing environmental pollution.

In the manufacturing method according to this embodiment, the whole steps, starting from designing a product to completion of the product, may be feasible in retail stores and individual houses. According to this method, therefore, originally-designed permeable medium products may be easily made on an on-demand basis.

In case processing data is prepared in advance and available, the manufacturing method according to this embodiment may omit the processing data generating step.

In case an inkjet-printed image is unnecessary for a permeable medium product to be made, the manufacturing method according to this embodiment may omit the image printing step.

In case the worker makes a permeable medium product by sewing instead of using the adhesive, the manufacturing method according to this embodiment may omit the adhesive applying step.

For any intricate product difficult to be sewed, the manufacturing method according to this embodiment may provide a plurality of sewing steps performed by the worker. The manufacturing method according to this embodiment may further include a tacking step as conventionally performed to make sewn products. In this step, images of shape-retaining main parts alone are attached to preset tacking positions or positions determined by the worker, and then pressed with a small iron heater to be partly heated and tentatively bonded for preliminary check of the product' shape, design, and layout.

The inkjet printer 40 according to this embodiment has the image-printing carriage 45 and the adhesive-application carriage 48. Optionally, two inkjet printers may be used, one of which is provided with the image-printing carriage 45, and the other with the adhesive-application carriage 48 in order to exclusively use one of the inkjet printers for the image printing step, and the other for the adhesive applying step.

In this embodiment, the inkjet printer 40 and the laser cutter 60 are two separate devices. The inkjet printer 40 may be further equipped with a cutting device for use in cutting the permeable medium 12. Such an inkjet printer may be used in the cutting step instead of the laser cutter 60.

In this embodiment, the inkjet printer 40 is a serial printer. The inkjet printer 40 may be a line printer in so far as this printer has an ultraviolet irradiation device at a position at which the ink on the permeable medium 12 can be irradiated with ultraviolet light. In case the inkjet printer 40 is a line printer having plural inkjet heads, the printer may have plural ultraviolet irradiation devices, each for a respective one of the inkjet heads, or one ultraviolet irradiation device shared among all of the inkjet heads on the downstream side in the direction of relative movement of the permeable medium 12 to the inkjet heads.

In the inkjet printer 40, one ultraviolet irradiation device is mounted in the carriage with the inkjet head(s) and disposed on one side alone of the inkjet head(s) in the main scanning direction. In the inkjet printer 40, two ultraviolet irradiation devices may be mounted in the carriage with the inkjet head(s) and disposed on both sides of the inkjet head(s) in the main scanning direction.

The maximum energy of irradiation in the inkjet printer 40, which is desirably not too large to burn the ink, is decided by the intensity and time of radiation from the ultraviolet irradiation device. In the inkjet printer 40, therefore, the intensity and time of radiation from the ultraviolet irradiation device may be automatically changed by the controller 55 or may be manually changed by the worker in accordance with printing conditions including printing speed, pass number, and dot density.

A suitable but non-limiting example of the image-printing ink used in this disclosure is a UV instant-drying ink. Other examples may include any inks usable for printing and difficult to smear on permeable media such as fabrics and papers in which image-formed parts are uncoated. Examples of such inks may include latex inks, UV-curable inks, and water-soluble, UV-curable dye inks.

A suitable but non-limiting example of the adhesive-containing ink used in this disclosure is a UV instant-drying ink. Other examples may include any inks usable for printing and difficult to smear on permeable media such as fabrics and papers in which image-formed parts are uncoated. Examples of such inks may include latex inks, UV-curable inks, and aqueous inks.

What is claimed is:

1. A manufacturing method, comprising:
   an image printing step of forming an image by inkjet printing on a permeable medium based on a processing data;
   a cutting step of cutting the permeable medium into parts in shapes based on the processing data after the image is printed on the permeable medium by inkjet printing in the image printing step; and
   an assembling step of assembling the parts into a product,
   wherein the image printing step using an ink for image printing, and the ink containing a heat-producible composition that generates heat when being irradiated with ultraviolet light and a solvent, and the ink is able to be dried and fixed after the solvent is vaporized from the ink heated by the heat generated by the heat-producible composition when being irradiated with the ultraviolet light,
   by an irradiation of the ultraviolet light, the solvent is vaporized to an extent that the image printed on the permeable medium does not smear, and a maximum energy of the irradiation of the ultraviolet light is an energy which does not cause the ink to be burned, and
   the image printing step uses an ink for image printing selected from latex inks, solvent-diluted UV-curable inks, and water-soluble UV-curable dye inks, wherein a temperature range of the ink irradiated by the irradiation of the ultraviolet light is 60° C.~170° C.

2. The manufacturing method according to claim 1, further comprising:
   an adhesive applying step of applying an ink containing an adhesive to the permeable medium based on the processing data by inkjet printing, so as to apply the adhesive to the permeable medium, wherein
   in the cutting step, the permeable medium is cut in shapes based on the processing data into the parts after the image is formed on the permeable medium by inkjet printing in the image printing step and the adhesive is applied to the permeable medium in the adhesive applying step, and
   in the assembling step, the adhesive applied to the parts is heated to bond the parts to each other.

3. The manufacturing method according to claim 2, wherein
   the ink containing the adhesive is an ink that is able to be dried and fixed after a solvent is vaporized from the ink heated by ultraviolet irradiation.

4. The manufacturing method according to claim 2, wherein
   the ink containing the adhesive is one selected from latex inks, UV-curable inks, and aqueous inks.

5. The manufacturing method according to claim 1, wherein
   the temperature range of the ink irradiated by the irradiation of the ultraviolet light is 60° C.~150° C.

6. A manufacturing method, comprising:
   an adhesive applying step of applying an ink containing an adhesive to a permeable medium based on a processing data by inkjet printing, so as to apply the adhesive to the permeable medium;
   a cutting step of cutting the permeable medium into parts in shapes based on the processing data after the adhesive is applied to the permeable medium in the adhesive applying step; and
   an assembling step of assembling the parts into a product, wherein the assembling step being a step of heating the adhesive applied to the parts, so as to bond the parts to each other,
   wherein the ink is an adhesive-containing ink, and the ink further containing a heat-producible composition that generates heat when being irradiated with ultraviolet light and a solvent, and the ink is able to be dried and fixed after the solvent is vaporized from the ink heated by the heat generated by the heat-producible composition when being irradiated with the ultraviolet light,
   by an irradiation of the ultraviolet light, the solvent is vaporized to an extent that the adhesive-containing ink applied on the permeable medium does not smear and a maximum energy of the irradiation of the ultraviolet light is an energy which does not cause the ink to be burned, and
   wherein the image printing step uses an ink for image printing selected from latex inks, solvent-diluted UV-curable inks, and water-soluble UV-curable dye inks, wherein a temperature range of the ink irradiated by the irradiation of the ultraviolet light is 60° C.~170° C.

7. The manufacturing method according to claim 6, wherein
   the ink containing the adhesive is one selected from latex inks, UV-curable inks, and aqueous inks.

8. The manufacturing method according to claim 6, wherein
   the temperature range of the ink irradiated by the irradiation of the ultraviolet light is 60° C.~150° C.

* * * * *